(12) United States Patent
Kageyama

(10) Patent No.: US 7,995,910 B2
(45) Date of Patent: Aug. 9, 2011

(54) IMAGING DEVICE AND FOCAL POINT DETECTOR

(75) Inventor: Kazumi Kageyama, Osaka (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/657,766

(22) Filed: Jan. 27, 2010

(65) Prior Publication Data

US 2010/0195998 A1 Aug. 5, 2010

(30) Foreign Application Priority Data

Feb. 3, 2009 (JP) ................ P2009-022225

(51) Int. Cl.
*G03B 3/00* (2006.01)
*G03B 13/00* (2006.01)
*H04N 5/232* (2006.01)
(52) U.S. Cl. ............... 396/128; 348/350; 250/201.8
(58) Field of Classification Search .......... 396/104, 396/121, 126–128, 120, 125; 348/345, 348, 348/349, 350, 353–356; 250/201.2, 201.4, 250/201.6, 201.7, 201.8, 201.9
See application file for complete search history.

(56) References Cited

U.S. PATENT DOCUMENTS
2007/0109440 A1 5/2007 Hamano

FOREIGN PATENT DOCUMENTS
JP 2003-107323 A 4/2003
JP 2007-139935 A 6/2007

*Primary Examiner* — Rochelle-Ann J Blackman
(74) *Attorney, Agent, or Firm* — Lerner, David, Littenberg, Krumholz & Mentlik, LLP

(57) ABSTRACT

A focal point detector includes: a condenser lens for transmitting a light image from an optical system; and a distance measurement sensor group for receiving a luminous flux which has passed through the condenser lens. The sensor group includes a first distance measurement sensor pair for receiving divided beams of the luminous flux for a first focus detection region which is located off the center of a shooting region. The first distance measurement sensor pair includes first and second distance measurement sensors. The first focus detection region extends in a first direction in the shooting region from a position where the first focus detection region is spaced from the center in the first direction and also in a second direction. The first and second distance measurement sensors are spaced from each other and arranged at different angles in the direction associated with the first direction on the sensor arrangement surface.

9 Claims, 25 Drawing Sheets

<ORIGINAL LIGHT IMAGE>

<LIGHT IMAGE ON SENSOR CHIP>

<LIGHT IMAGE ON SENSOR CHIP>

IMAGING DEVICE AND FOCAL POINT DETECTOR

CROSS-REFERENCE TO RELATED APPLICATION

The present application claims priority from Japanese Patent Application No. JP 2009-022225 filed in the Japanese Patent Office on Feb. 3, 2009, the entire content of which is incorporated herein by reference.

BACKGROUND OF THE INVENTION

1. Field of the Invention

The present invention relates to an imaging device and more particularly to an autofocus technique (AF technique).

2. Description of the Related Art

In a phase difference AF (autofocus) technique, the focus lens position is detected based on the following principle. More specifically, "two luminous fluxes" (partial luminous fluxes) from the shooting optical system are collected by respective image reforming lenses (separator lenses) or other lenses and received by respective photoelectric element arrays (also referred to as the distance measurement sensors). The two luminous fluxes originate from the same point on the subject and have passed through regions of the shooting lens different from each other (e.g., regions symmetrical with respect to the optical axis). The amount and direction of displacement from the position of the focus lens (also referred to as the in-focus position) adapted to bring the subject into focus are detected by detecting the relative positional relationship between the subject images received by the two distance measurement sensors (distance measurement sensor pair). It should be noted that the distance measurement sensor pair obtains the change in gray level of each of the subject images in a predetermined direction (direction in which the photoreceiving element array is arranged in each distance measurement sensor) and performs distance measurement based on the change in gray level of each of the subject images (divided images) in the predetermined direction. That is, the distance measurement sensor pair provides distance measurement sensitive to the gray level change in the predetermined direction of the subject images.

In some phase difference-based focal point detectors, on the other hand, a plurality of pairs of distance measurement sensors (also referred to as the distance measurement sensor pairs) as described above are provided so as to detect the focus lens position relating to the subject at a plurality of positions (distance measurement points) in a shot image.

Examples of such a technique are described in Japanese Patent Laid-Open No. 2003-107323 (referred to as Patent Document 1) and Japanese Patent Laid-Open No. 2007-139935 (referred to as Patent Document 2).

The focal point detectors described in Patent Documents 1 and 2 have a condenser lens, stop mask, separator lens and distance measurement sensors. A total of three condenser lenses are provided as a condenser lens. More specifically, one of the condenser lenses (also referred to as the center lens) is provided at the center of the shooting lens through which the optical axis passes. Two other lenses (also referred to as the side lenses) are arranged one on each side of the condenser lens at the center.

As for the distance measurement points provided near the center of the shot image, distance measurement (focal point detection) is performed using the light passing through the "center lens" of the three condenser lenses. As for the distance measurement points provided relatively far from the center of the shot image, on the other hand, distance measurement is performed using the light passing through the "side lenses."

SUMMARY OF THE INVENTION

However, the techniques as described above involve a distortion (such as pincushion distortion or barrel distortion) associated with the optics (e.g., condenser lenses) of the focal point detector. Proper designing of the optics provides, to a certain extent, reduced distortion. It is, however, difficult to completely eliminate the distortion.

On the other hand, the optical axes of the condenser lenses (side lenses) for the off-axis distance measurement points are displaced from (eccentric with respect to) the optical axis of the shooting lens. It is extremely difficult to suppress distortion under a variety of constraints particularly in such a case.

In the presence of such a distortion, the light image passing through the condenser lenses does not properly reach the distance measurement sensor pairs arranged along the predetermined direction. This leads to improper detection of the associated subject image by the distance measurement sensor pairs, possibly resulting in insufficient AF accuracy.

In light of the foregoing, it is desired to provide a focal point detection technique which provides reduced impact of distortion resulting from the optical system of a focal point detector for improved AF accuracy.

A first mode of the present invention is a focal point detector and an imaging device having the same. The focal point detector includes a condenser lens and distance measurement sensor group. The condenser lens transmits a light image from an optical system. The distance measurement sensor group receives a luminous flux which has passed through the condenser lens. The distance measurement sensor group includes a first distance measurement sensor pair adapted to receive divided beams of the luminous flux for a first focus detection region which is located off the center of a shooting region. The first distance measurement sensor pair includes first and second distance measurement sensors. The first focus detection region extends in a first direction in the shooting region from a position where the same region is spaced from the center of the shooting region in the first direction and also in a second direction perpendicular to the first direction. On a sensor arrangement surface, the first and second distance measurement sensors are spaced from each other in the direction associated with the first direction and arranged at different angles.

A second mode of the present invention is a focal point detector and an imaging device having the same. The focal point detector includes a condenser lens and distance measurement sensor group. The condenser lens transmits a light image from an optical system. The distance measurement sensor group receives a luminous flux which has passed through the condenser lenses. The distance measurement sensor group has a first distance measurement sensor pair adapted to receive divided beams of the luminous flux for a first focus detection region which is located off the center of a shooting region. The first focus detection region extends in a first direction in the shooting region from a position where the same region is spaced from the center of the shooting region in the first direction and also in a second direction perpendicular to the first direction. On a sensor arrangement surface, the first and second distance measurement sensors are spaced from each other in the direction associated with the first direction and arranged at different positions in the direction associated with the second direction.

The present invention provides reduced impact of distortion resulting from the optical system of a focal point detector, thus ensuring improved AF accuracy.

DETAILED DESCRIPTION OF THE PREFERRED EMBODIMENTS

Figure 1:
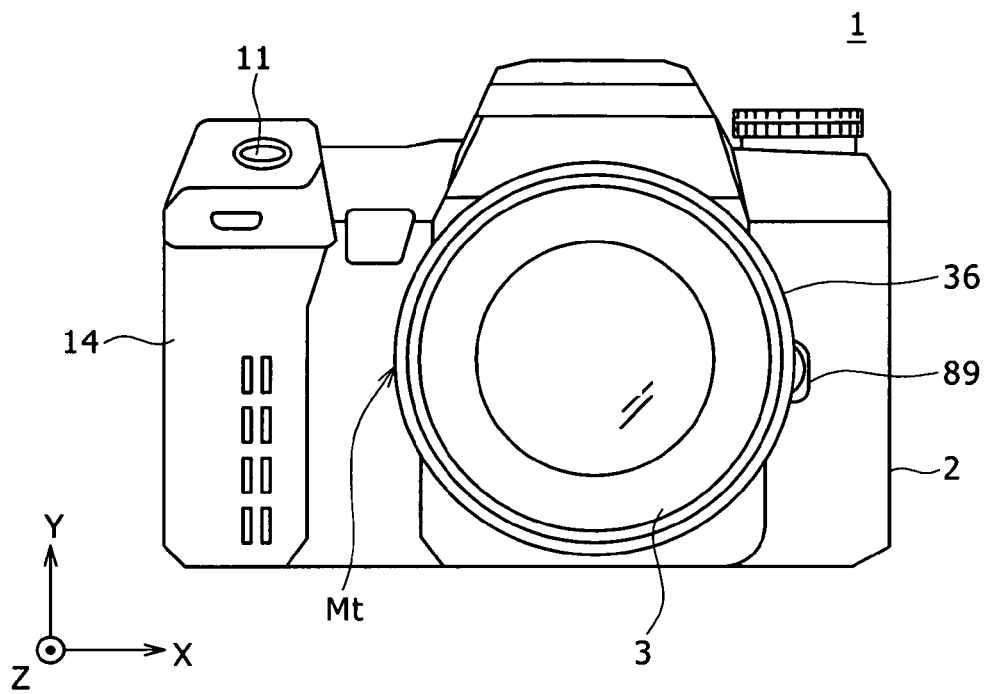
FIG. 1 is a front view of the appearance of an imaging device.
Figure 2:
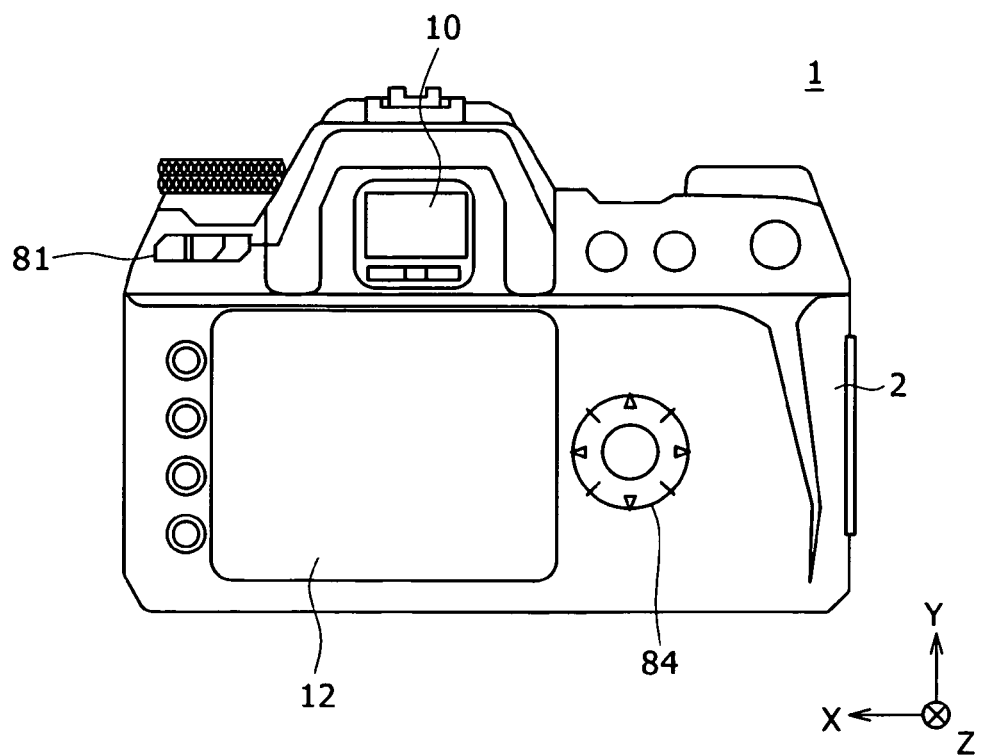
FIG. 2 is a rear view of the appearance of the imaging device.

A description will be given below of forms for carrying out the present invention (also referred to as embodiments). It should be noted that the description will be given in the following order:

1. First embodiment (example in which the sensors of each distance measurement sensor pair are arranged at different angles and shifted from each other)
2. Second embodiment (example in which the arrangements of both of the sensors of each distance measurement sensor pair are changed)
3. Third embodiment (example in which the sensors of each distance measurement sensor pair are shifted from each other)
4. Fourth embodiment (example in which the sensors of each distance measurement sensor pair are arranged at different angles)
5. Modification examples 1. First Embodiment 1-1. Outline of the Configuration FIGS. 1 and 2 are diagrams illustrating the appearance and configuration of an imaging device 1 (1A) according to an embodiment of the present invention. Here, FIG. 1 is a front view of the appearance of the imaging device 1, and FIG. 2 a rear view of the appearance thereof. The imaging device 1 is configured as a lens-exchangeable single lens reflex digital camera.

As illustrated in FIG. 1, the imaging device 1 includes a camera body 2. An exchangeable shooting lens unit (exchangeable lens) 3 is attachable and detachable to and from the camera body 2.

The shooting lens unit 3 primarily includes a lens barrel 36, lens group 37 (refer to FIG. 3), stop and other components included in the lens barrel 36. The lens group 37 (shooting optical system) includes a focus lens and other lenses. The focus lens moves along the optical axis to change the focal point.

The camera body 2 includes a circular mount portion Mt roughly at its center. The shooting lens unit 3 is attached to the mount portion Mt. The camera body 2 also includes an attach/detach button 89 near the circular mount portion Mt. The attach/detach button 89 permits the shooting lens unit 3 to be attached or detached.

Further, the camera body 2 includes a grip portion 14 on the left edge on the front. The grip portion 14 is held by the photo-taker. A release button 11 for indicating the initiation of exposure is provided on the top surface of the grip portion 14. Battery and card compartments are provided inside the grip portion 14. The battery compartment holds, for example, a lithium-ion battery as a power source for the camera. The card compartment holds a memory card 90 (refer to FIG. 3). The memory card 90 records shot image data.

The release button 11 is a two-step detection button which can detect two states; a halfway pressed state (S1 state) and a fully pressed state (S2 state). When the release button 11 is halfway pressed into the S1 state, preparations (e.g., AF control operation) are made to obtain a recording still image (actual shot image) of the subject. When the release button 11 is further pressed into the S2 state, the actual image is shot. More specifically, the subject image (light image of the subject) is exposed using an imaging element 5 (described later). The image signal obtained by the exposure undergoes a series of image processing operations. As described above, the imaging device 1 considers that an instruction to prepare for shooting has been issued when the release button 11 is pressed into the halfway pressed state S1. On the other hand, the imaging device 1 considers that an instruction to shoot an image has been issued when the release button 11 is pressed into the fully pressed state S2.

In FIG. 2, a viewfinder window (eyepiece window) 10 is provided approximately at the center top on the back of the camera body 2. The photo-taker can visually recognize the subject light image guided from the shooting lens unit 3 so as to determine the composition by looking through the viewfinder window 10. That is, the composition can be determined by using the optical finder.

In FIG. 2, a back monitor 12 is provided approximately at the center on the back of the camera body 2. The back monitor 12 includes, for example, a color liquid crystal display (LCD).

The back monitor 12 can display a menu screen which allows, for example, for shooting conditions to be specified. When in reproduction mode, the back monitor 12 can also reproduce and display shot images recorded on the memory card 90.

A power switch (main switch) 81 is provided on the left top of the back monitor 12. The power switch 81 includes a two-point slide switch. When set to the OFF position on the left, the power switch 81 turns off the power. When set to the ON position on the right, the same switch 81 turns on the power.

A direction select key 84 is provided to the right of the back monitor 12. The same key 84 includes a circular operation button and can detect the pressing of the control button in a total of eight directions, top, bottom, left, right, top right, top left, bottom right and bottom left. In addition to the above eight directions, the direction select key 84 can also detect the pressing of the push button at the center. The same key 84 is used to select settings and operations.

1-2. Functional Block

Figure 3:
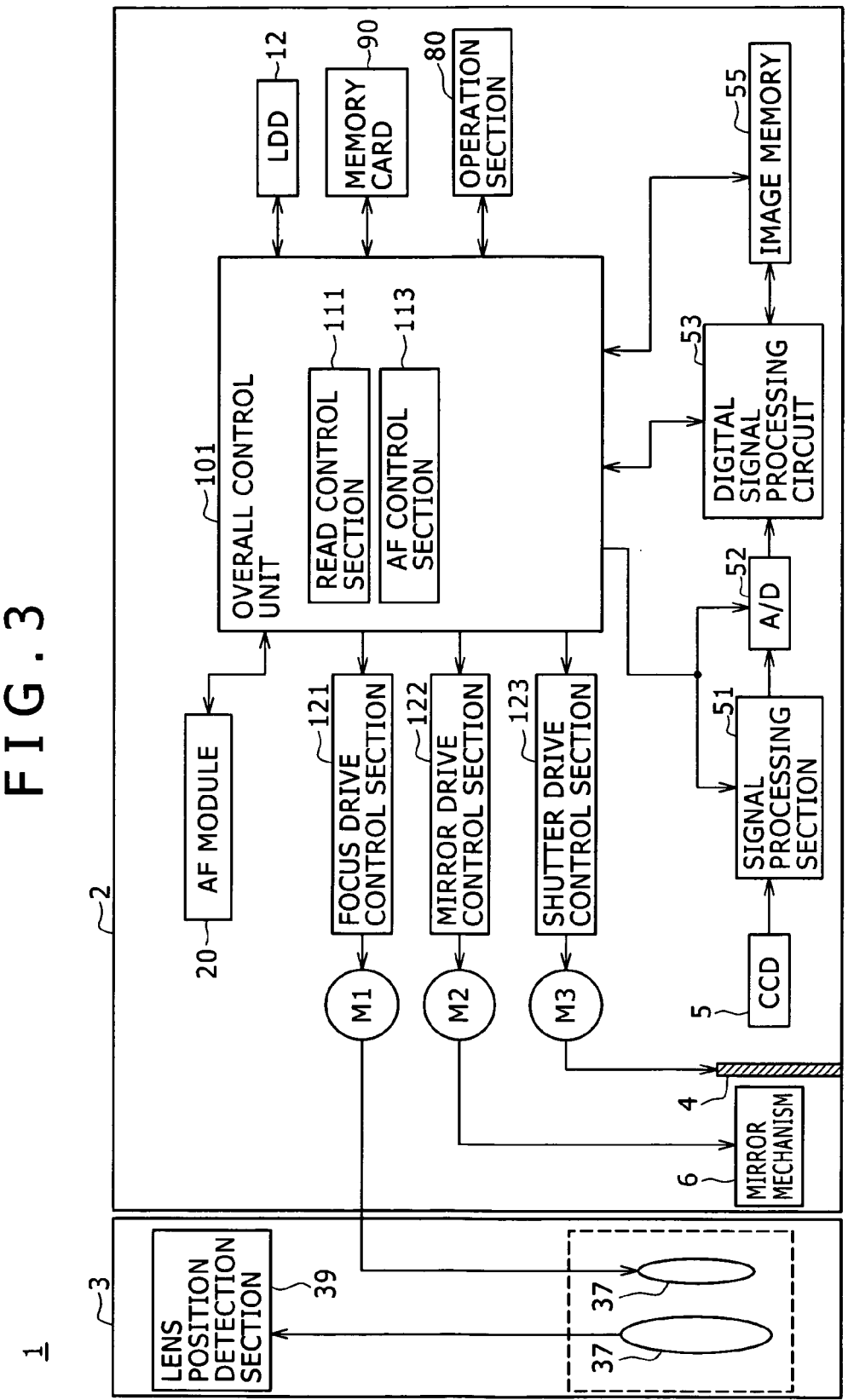
FIG. 3 is a block diagram illustrating the functional configuration of the imaging device.

Next, the functions of the imaging device 1 will be outlined with reference to FIG. 3. FIG. 3 is a block diagram illustrating the functional configuration of the imaging device 1.

As illustrated in FIG. 3, the imaging device 1 includes an AF sensor module 20, operation section 80, overall control unit 101, focus drive control section 121, mirror drive control section 122, shutter drive control section 123, digital signal processor 53 and other components.

The operation section 80 includes a variety of buttons and switches including the release button 11 (refer to FIG. 1). The overall control unit 101 carries out various operations in response to the user input to the operation section 80.

The AF sensor module (also simply referred to as the AF module) 20 can detect the in-focus condition of the subject using the light entering via a mirror mechanism 6 by means of a phase difference-based in-focus condition detection method. The AF module 20 is also called a focal point detector.

The overall control unit 101 is configured as a microcomputer and primarily includes a CPU, memory, ROM (e.g., EEPROM) and other components. The same section 101 reads the programs from the ROM for execution by the CPU, thus performing various functions.

More specifically, the overall control unit 101 includes a read control section 111, an AF control section 113 and other components.

The read control section 111 converts the charge, generated by photoelectric action of the imaging element 5, into an electric signal, thus controlling the read operation from the imaging element 5. The read electric signal is generated as an image signal.

The AF control section (in-focus control section) 113 operates together with the AF sensor module 20, focus drive control section 121 and other components to perform an in-focus control operation (AF operation) adapted to control the focus lens position. The AF control section 113 carries out the AF operation using the focus drive control section 121 based on the results of distance measurement performed by the AF module 20. More specifically, the AF control section 113 performs the AF operation based on the focus lens position detected by the AF module 20. The phase difference AF module allows the focus lens position to be found at extremely high speed.

Figure 4:
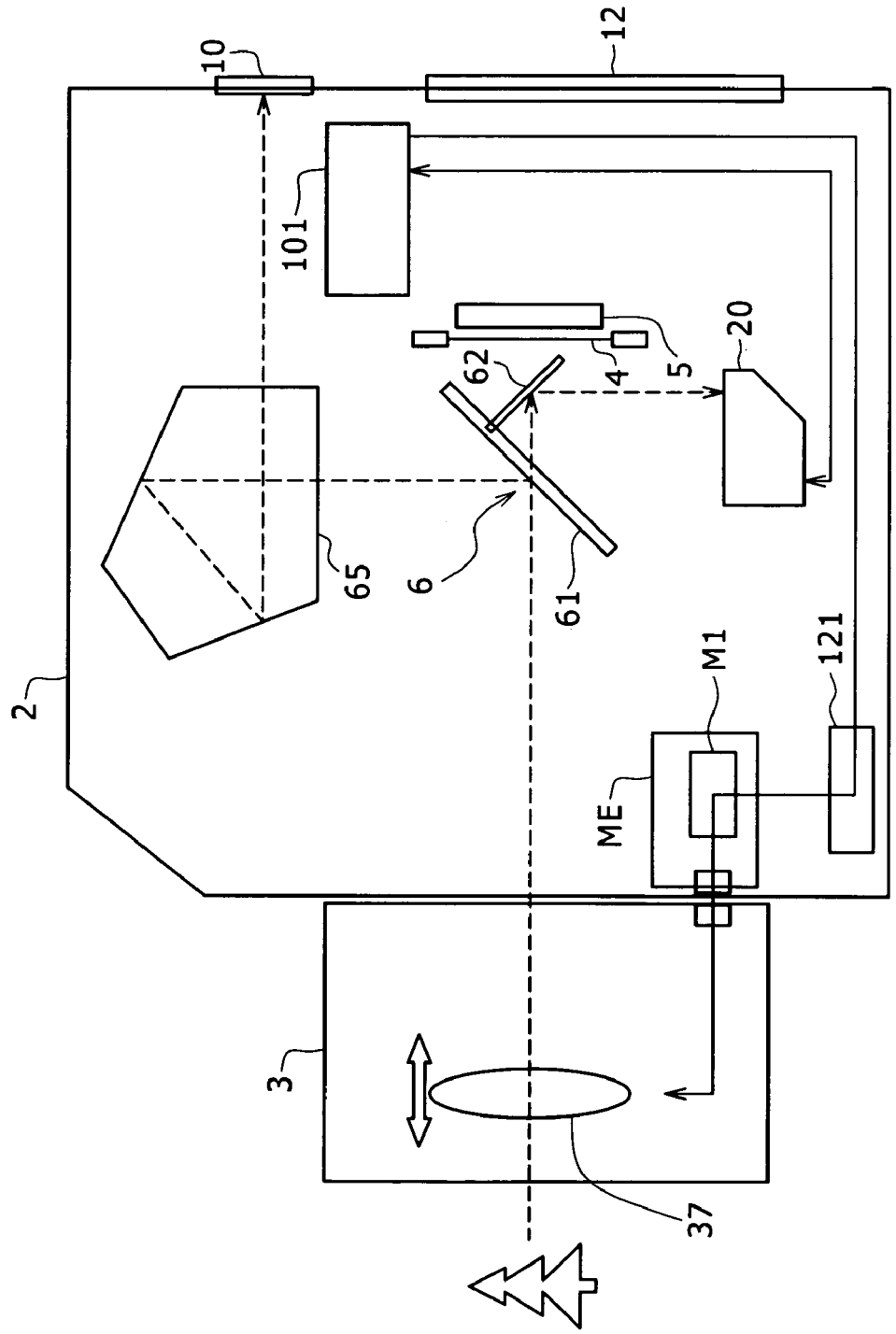
FIG. 4 is a diagram illustrating the internal configuration of an imaging device.

On the other hand, the focus drive control section 121 operates together with the overall control unit 101 to carry out the in-focus control operation. More specifically, the focus drive control section 121 generates a control signal based on the signal supplied from the overall control unit 101, thus driving a motor M1. As a result, the focus lens included among the lens group 37 of the shooting lens unit 3 is moved by a drive mechanism ME (FIG. 4). Further, the focus lens position is detected by a lens position detection section 39 of the shooting lens unit 3. As a result, data indicating the focus lens position is transmitted to the overall control unit 101. As described above, the focus drive control section 121 controls, for example, the movement of the focus lens along the optical axis.

The mirror drive control section 122 controls the switching between two states; one in which the mirror mechanism 6 is retracted from the optical path (mirrors raised) and another in which the mirror mechanism 6 blocks the optical path (mirrors lowered). The same section 122 generates a control signal based on the signal supplied from the overall control unit 101 to drive a motor M2, thus switching the mirrors between the raised and lowered states.

The shutter drive control section 123 generates a control signal based on the signal supplied from the overall control unit 101 to drive a motor M3, thus controlling the opening and closing of a shutter 4.

The imaging element (here, CCD sensor (also simply referred to as the CCD)) 5 is a photoreceiving element adapted to convert the subject light image (subject image) from the shooting lens unit 3 into an electric signal by photoelectric action. The same element 5 generates and obtains an image signal (recording image signal) associated with the actual shot image.

The imaging element 5 performs exposure (accumulation of charge by photoelectric conversion) of the subject image formed on the photoreceiving surface in response to drive control signals (accumulation start and end signals) from the overall control unit 101, thus generating an image signal associated with the subject image. Further, the imaging element 5 outputs the image signal to a signal processing section 51 in response to a read control signal from the overall control unit 101.

After the image signal obtained by the imaging element 5 is subjected to predetermined analog signal processing by the signal processing section 51, the image signal which has undergone the analog signal processing is converted to digital image data (image data) by an A/D conversion circuit 52. This image data is fed to a digital signal processing circuit 53.

The digital signal processing circuit 53 subjects the image data from the A/D conversion circuit 52 to digital signal processing, thus generating image data associated with the shot image. The same circuit 53 includes a black level correction circuit, white balance (WB) circuit, gamma correction circuit and other circuitry to perform various types of digital image processing. It should be noted that the image signal (image data) processed by the digital signal processing circuit 53 is stored in an image memory 55. The image memory 55 is a quickly accessible image memory which temporarily stores the generated image data. The same memory 55 is capable of storing a plurality of frames of image data.

During actual shooting, the image data temporarily stored in the image memory 55 undergoes image processing (e.g., compression) by the overall control unit 101 first and then is stored in the memory card 90.

1-3. Internal Configuration of the Imaging Device

A description will be given next of the internal configuration of the imaging device 1 with reference to FIG. 4. FIG. 4 is a schematic diagram of the inside of the imaging device 1 as seen from the side.

The mirror mechanism 6 of the imaging device 1 has a main mirror (main reflecting surface) 61 and a sub-mirror (auxiliary reflecting surface) 62. The driving operation of a mirror drive mechanism (not shown) switches the mirror mechanism 6 between two states; one in which the same mechanism 6 is retracted from the optical path (mirrors raised) and another in which the same mechanism 6 blocks the optical path (mirrors lowered).

When the mirrors are lowered (FIG. 4), the main mirror 61 and sub-mirror 62 of the mirror mechanism 6 are arranged in the optical path (shooting optical path) of the luminous flux (subject image) from the shooting lens unit 3. The luminous flux is reflected first by the main mirror (main reflecting surface) 61 toward the camera top and then reflected again by a pentaprism 65 provided at the top of the camera body 2 and guided to the viewfinder window 10 as an observation luminous flux. On the other hand, at least part of the main mirror 61 is configured as a half-mirror. After passing through the half-mirror portion of the main mirror 61, part of the luminous flux from the shooting lens unit 3 is reflected by the sub-mirror (auxiliary reflecting surface) 62 and guided to the AF module 20 provided on the bottom of the camera body 2 for use in the phase difference AF operation. It should be noted that the luminous flux guided to the AF module 20 is also referred to as the distance measurement luminous flux because the flux is used for the AF operation (more specifically, distance measurement operation).

On the other hand, when the mirrors are raised, the main mirror 61 and sub-mirror 62 are retracted from the optical path of the subject image from the shooting lens unit 3, thus allowing the subject image to travel toward the shutter 4 and imaging element 5. When the mirrors are raised, the imaging element 5 shoots an actual image. More specifically, the imaging element 5 performs exposure during the opening of the shutter 4, thus providing an actual shot image.

For example, before the release button 11 is pressed into the fully pressed state S2 (that is, when the composition is determined), the mirrors of the mirror mechanism 6 are lowered (FIG. 4). At this time, the subject image from the shooting lens unit 3 is reflected upward by the main mirror 61 and passes through the pentaprism 65 and viewfinder window 10 to reach the photo-taker's eyes as a light flux for viewing. In this condition, the composition is determined using an optical viewfinder (OVF). Further, the phase difference AF operation is performed using the luminous flux that has entered the AF module 20 after being reflected by the sub-mirror 62. More specifically, when the release button 11 is pressed into the halfway pressed state S1, the AF control operation is performed as a preparatory operation for shooting.

Then, when the release button 11 is pressed into the fully pressed state S2, the mirrors of the mirror mechanism 6 are raised, thus initiating the exposure. More specifically, the light from the shooting lens unit 3 travels without being reflected by the main mirror 61, reaching the imaging element 5 when the shutter 4 opens. The imaging element 5 generates a subject image signal based on the luminous flux received as a result of photoelectric conversion. As described above, a shot image of the subject (shot image data) is obtained as the luminous flux from the subject (subject image) is guided to the imaging element 5 after passing through the shooting lens unit 3.

1-4. Outline of the Phase Difference AF

A description will be given next of the principle of the phase difference AF.

Figure 5:
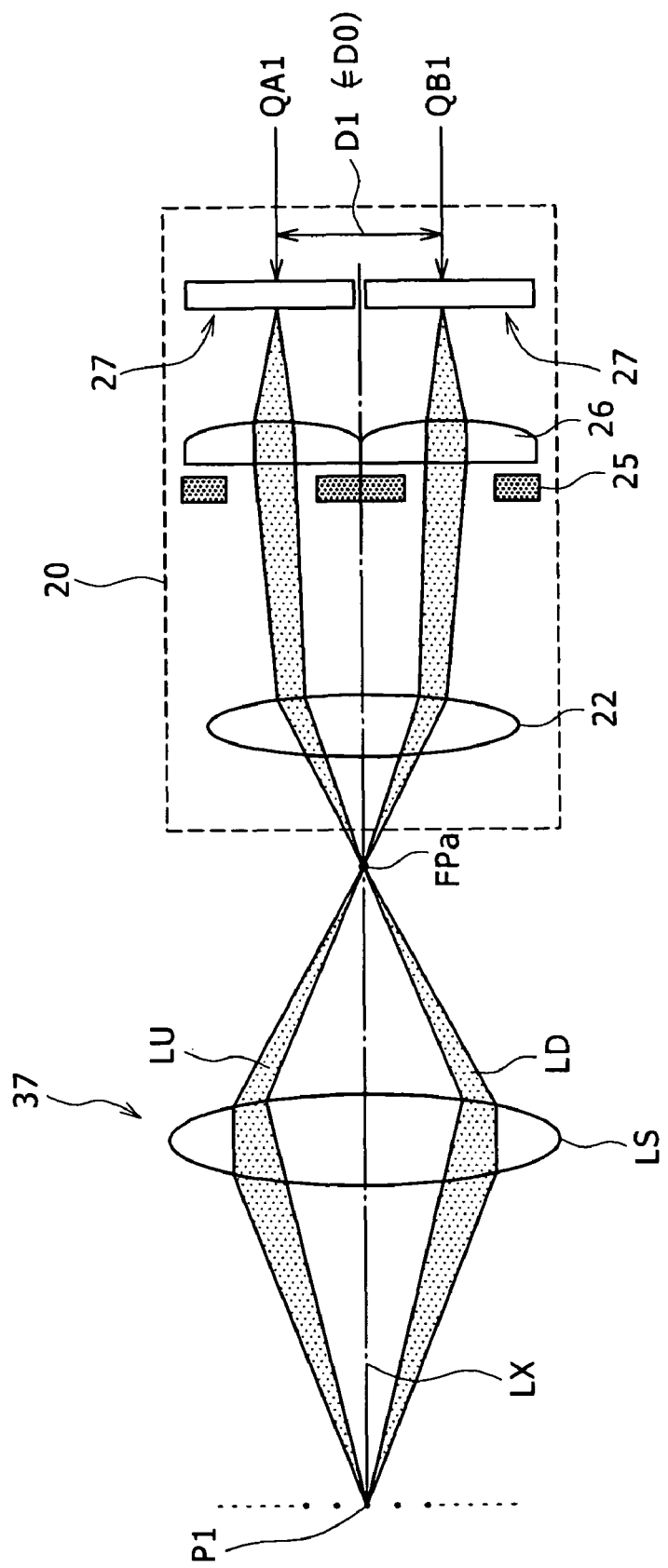
FIG. 5 is a diagram illustrating the principle of the phase difference AF (in focus)
Figure 6:
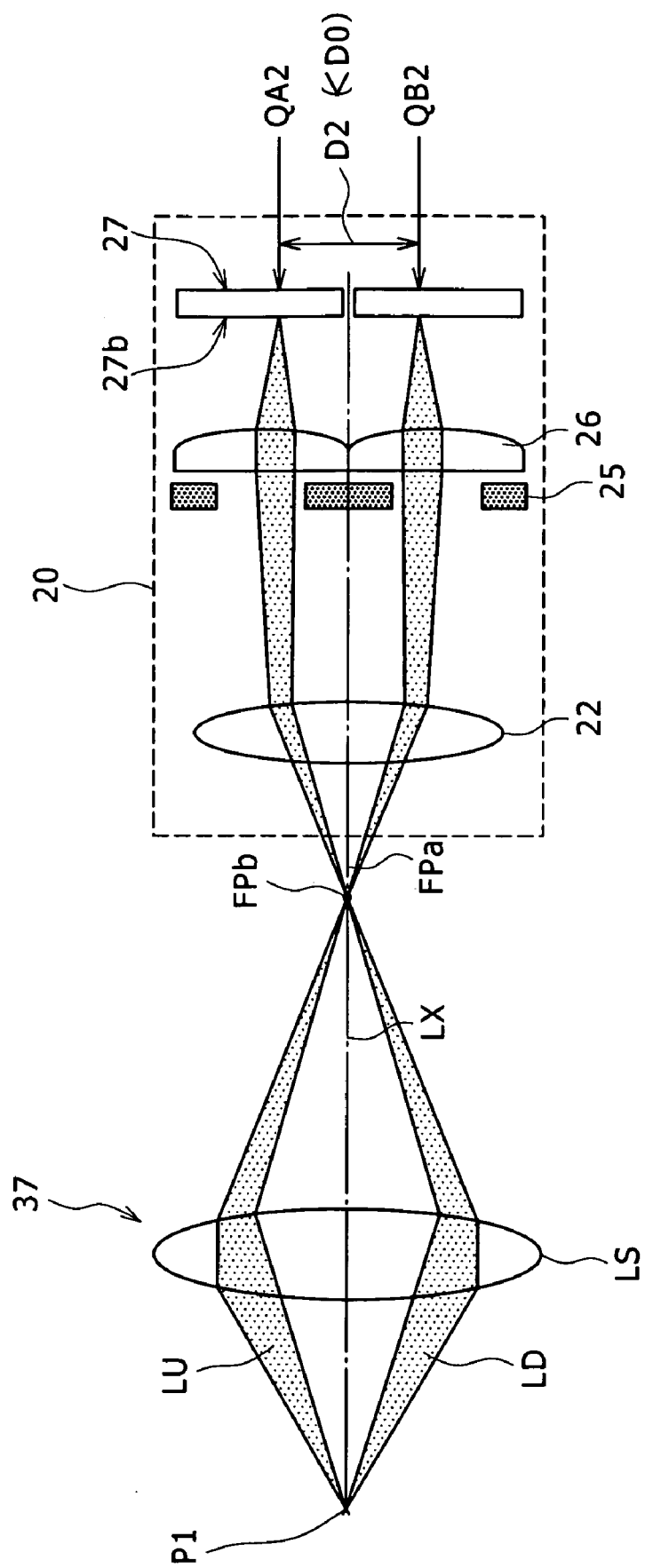
FIG. 6 is a diagram illustrating the principle of the phase difference AF (front-focused)
Figure 7:
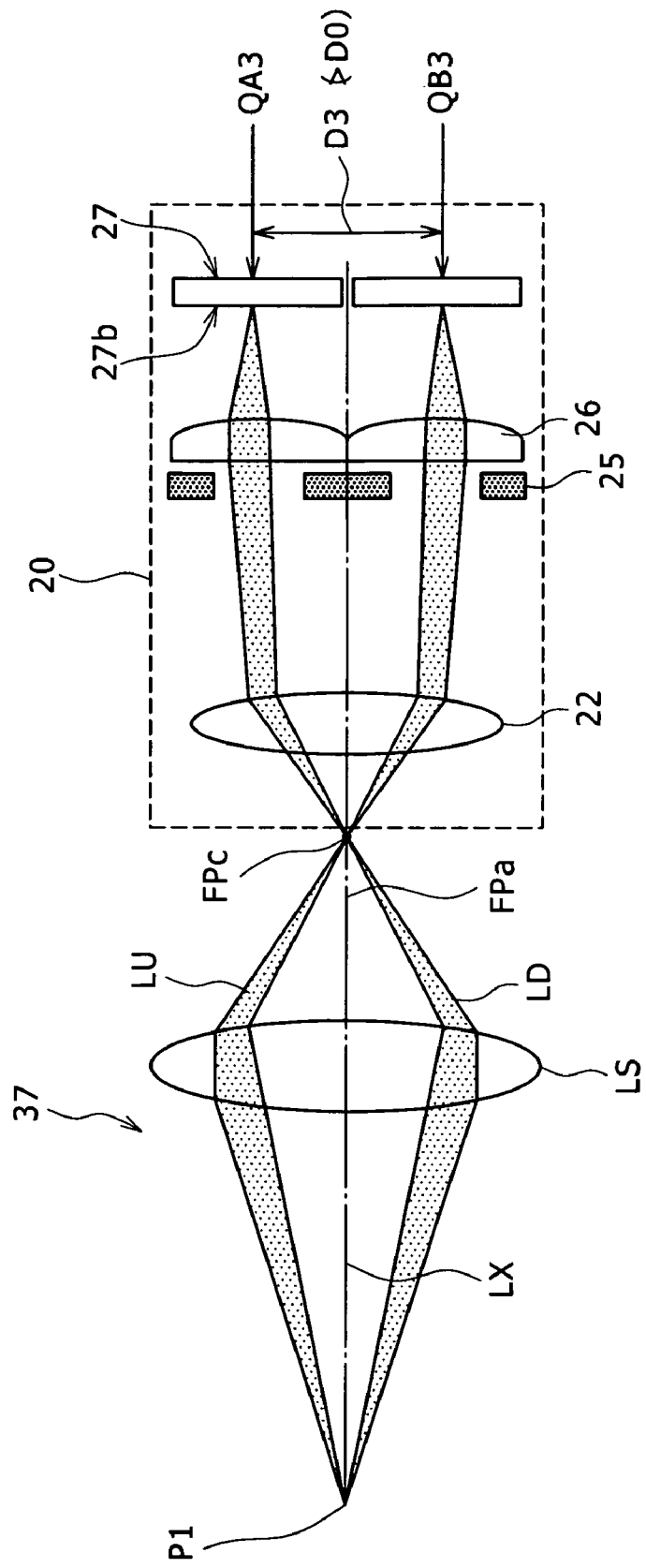
FIG. 7 is a diagram illustrating the principle of the phase difference AF (back-focused)

FIGS. 5 to 7 are diagrams illustrating the principle of the phase difference AF. FIG. 5 illustrates an in-focus condition, FIG. 6 a so-called front-focused condition, and FIG. 7 a so-called back-focused condition.

As illustrated in FIGS. 5 to 7, the AF module 20 includes AF sensors (also referred to as the distance measurement sensors) 27, a condenser lens 22, stop mask 25 and separator lens 26. A pair of photoreceiving element arrays (such as CCD line sensor) extending in a predetermined direction (X or Y direction) are provided, for example, as the AF sensors 27. It should be noted that, in these figures, the lens group 37 which includes a plurality of lenses is shown as a single lens LS for reasons of simplification.

First, FIG. 5 will be referred to. When the shooting lens LS is located at the in-focus position as illustrated in FIG. 5, the light from a given point P1 on the subject forms an image at a point FPa after passing through the shooting lens LS. More specifically, the light from the point P1 is collected again at the point FPa after passing through a variety of portions of the shooting lens LS. In FIG. 5, for example, both a luminous flux LD passing below an optical axis LX of the shooting lens LS and a luminous flux LU passing above the optical axis LX of the shooting lens LS reach the point FPa. At this time, the luminous flux LD passes further through the condenser lens 22, stop mask 25 and separator lens 26 and is collected at a position QA1 on the AF sensor 27. On the other hand, the luminous flux LU passes further through the condenser lens 22, stop mask 25 and separator lens 26 and is collected at a position QB1 on the AF sensor 27. As described above, the separator lens 26 and other components cause the luminous fluxes LD and LU to be collected separately at the different positions QA1 and QB1. At this time, a distance D1 between the positions QA1 and QB1 agrees with a predetermined distance (proper value) D0.

Figure 8:
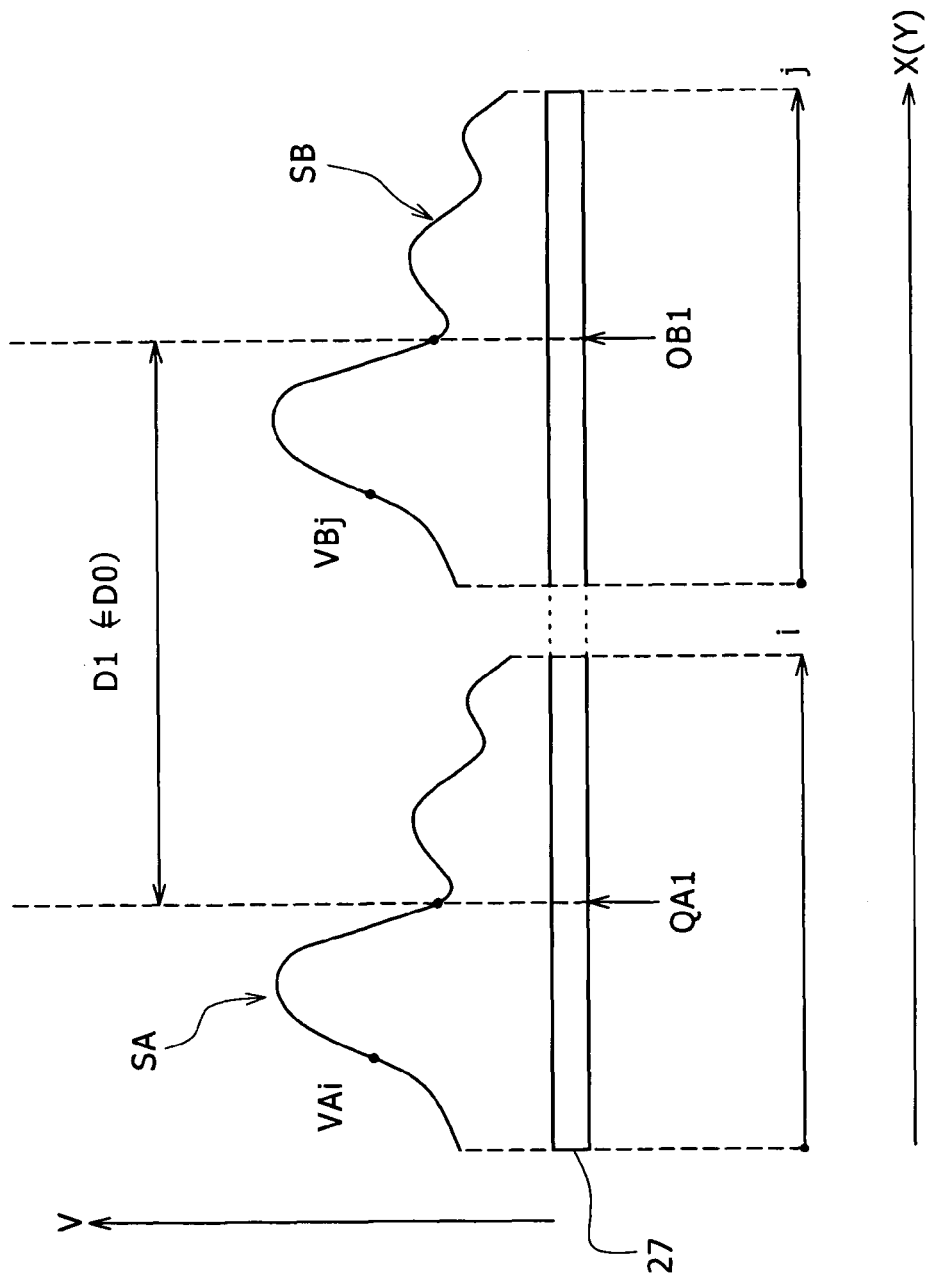
FIG. 8 is a diagram illustrating images of divided beams in an in-focus condition.

Practically, on the other hand, light from points other than the position P1 (points near the position P1) reaches near the positions QA1 and QB1 in the same manner. As a result, images SA and SB are formed respectively around the positions QA1 and QB1 as illustrated in FIG. 8. The image SA is a subject image which has reached near the position QA1 after passing below the shooting lens LS. On the other hand, the image SB is a subject image which has reached near the position QB1 after passing above the shooting lens LS. In FIG. 8, the horizontal axis represents a position x (or y) in a predetermined direction on the AF sensor 27, and the vertical axis a pixel value (gray level) V of the pixel (photoreceiving element) at each of the positions x (or y).

Next, when the shooting lens LS is located at the front-focused position as illustrated in FIG. 6, the light from the given point P1 forms an image at a point FPb after passing through the shooting lens LS. The point FPb is more forward (closer to the subject) than the point FPa. At this time, in FIG. 6, the luminous flux LD which has passed below the optical axis LX of the shooting lens LS passes further through the condenser lens 22, stop mask 25 and separator lens 26 and is collected at a position QA2. On the other hand, the luminous flux LU which has passed above the optical axis LX of the shooting lens LS passes further through the condenser lens 22, stop mask 25 and separator lens 26 and is collected at a position QB2. At this time, a distance D2 between the positions QA2 and QB2 is smaller than the predetermined distance D0.

Figure 9:
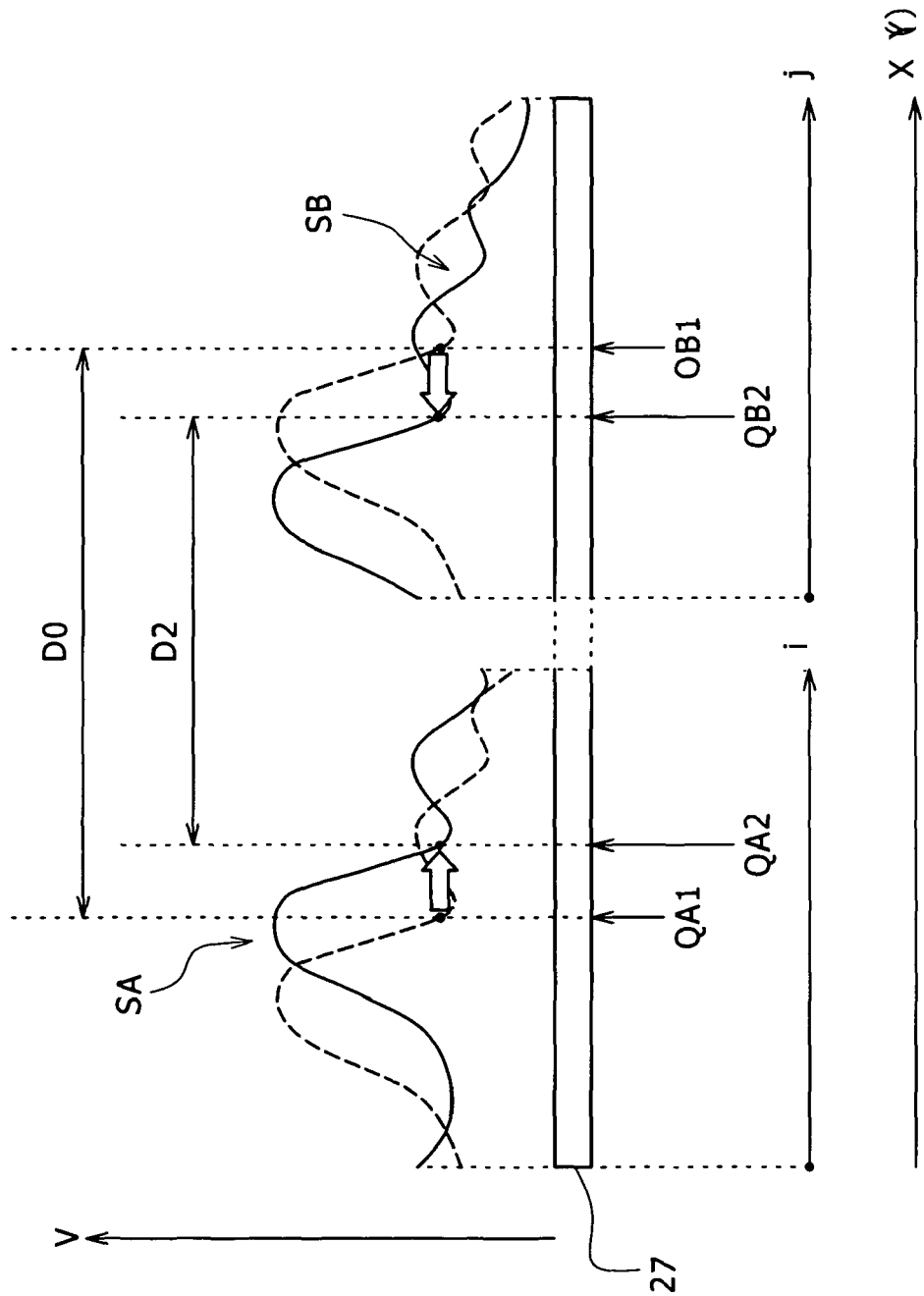
FIG. 9 is a diagram illustrating images of divided beams in a front-focused condition.

Practically, on the other hand, light from points other than the position P1 (points near the position P1) reaches near the positions QA2 and QB2 in the same manner. As a result, the images SA and SB are formed respectively around the positions QA2 and QB2 as illustrated in FIG. 9. The images SA and SB in the front-focused condition (FIG. 9) are formed closer to each other (in the directions indicated by the white arrows) than those in the in-focus condition (FIG. 8).

Further, when the shooting lens LS is located at the back-focused position as illustrated in FIG. 7, the light from the given point P1 forms an image at a point FPc after passing through the shooting lens LS. The point FPc is more backward than the point FPa. At this time, in FIG. 7, the luminous flux LD which has passed below the optical axis LX of the shooting lens LS passes further through the condenser lens 22, stop mask 25 and separator lens 26 and is collected at a position QA3. On the other hand, the luminous flux LU which has passed above the optical axis LX of the shooting lens LS passes further through the condenser lens 22, stop mask 25 and separator lens 26 and is collected at a position QB3. At this time, a distance D3 between the positions QA3 and QB3 is greater than the predetermined distance D0.

Figure 10:
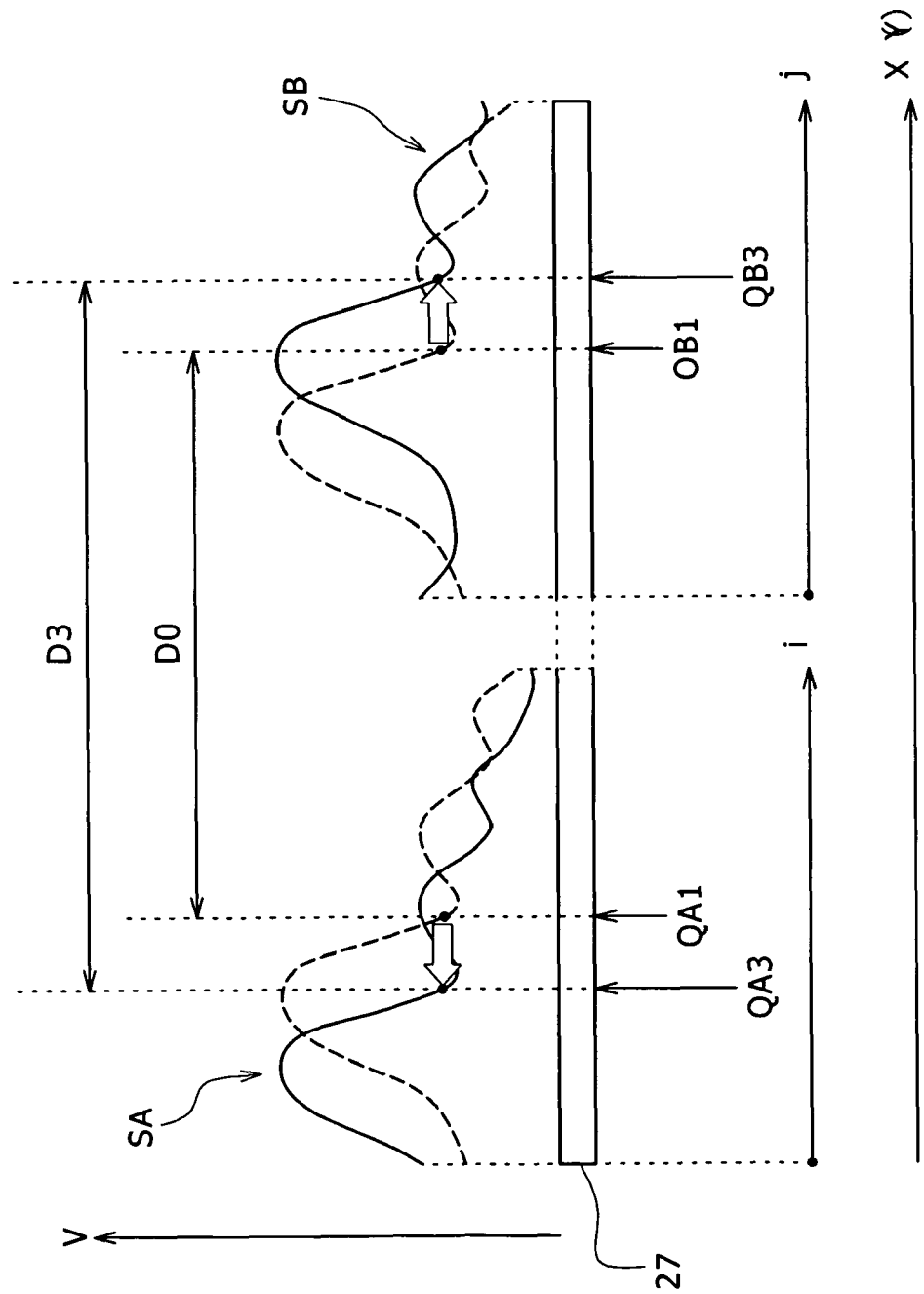
FIG. 10 is a diagram illustrating images of divided beams in a back-focused condition.

Practically, on the other hand, light from points other than the position P1 (points near the position P1) reaches near the positions QA3 and QB3 in the same manner. As a result, the images SA and SB are formed respectively around the positions QA3 and QB3 as illustrated in FIG. 10. The images SA and SB in the back-focused condition (FIG. 10) are formed farther from each other (in the directions indicated by the white arrows) than those in the in-focus condition (FIG. 8).

The displacement of the front- or back-focused condition from the in-focus condition can be found, for example, by the correlation calculation described below. More specifically, it is only necessary to find the value of function F(h) in Equation 1 for each variable h and find the value h which minimizes the function F(h).

[Equation 1]

$$F(h) = \sum_{i=0}^{N-1} |VA_i - VB_j| \text{ (where } j = i + h\text{)} \quad (1)$$

It should be noted that the value $VA_i$ represents the value of the pixel (photoreceiving element) at a position i of the light image SA, and the value $VB_j$ the value of the pixel (photoreceiving element) at a position j of the light image SB (refer to FIG. 8). On the other hand, although oriented in the same direction (horizontal direction in FIG. 8) as the coordinate axis i, the coordinate axis j is offset to the right of the distance D0 with respect to the coordinate axis i. The value N denotes the number of pixels subject to differential summation in Equation 1. On the other hand, the value h denotes the displacement between the light images SA and SB. The value h corresponds to the displacement from the in-focus condition.

In the in-focus condition, the function F(h) is minimized when j=1, that is, h=0. Further, ideally F(h)=0.

In the front- or back-focused condition, on the other hand, the function F(h) is minimized when the value h is a number other than 0 (zero). The sign of the value h indicates whether the lens is back- or front-focused. The absolute value of the value h indicates the extent of displacement from the in-focus condition.

The value h can be converted to a defocus amount (amount and direction of displacement of the focus lens from the in-focus lens position) of the focus lens based, for example, on a predetermined conversion table. That is, the value h is equivalent to the defocus amount. As described above, the defocus amount of the current focus lens position (amount and direction of displacement from the in-focus lens position) is detected by detecting the relative positional relationship between the subject images received by the two distance measurement sensors (pair of distance measurement sensors).

The imaging device 1 finds the value h adapted to minimize the function F(h) and moves the focus lens in such a manner as to compensate for the defocus amount associated with the value h. This allows the imaging device 1 to move the focus lens to the in-focus position.

The phase difference AF is conducted based on the above-described principle. Frankly, the distance measurement is performed by detecting the displacement between the two images (divided images) SA and SB in the direction in which the pair of AF sensors 27 are arranged (spaced from each other). The direction in which the AF sensors 27 are spaced from each other is also the direction in which the photoreceiving element arrays are arranged in the AF sensors 27. The pair of AF sensors 27 obtain the change in gray level of each of the subject images in the arrangement direction of the photoreceiving element arrays, thus performing distance measurement based on the change in gray level of each of the subject images in the arrangement direction. That is, the pair of AF sensors (distance measurement sensors) 27 provide distance measurement sensitive to the gray level change in the predetermined direction of the subject images (arrangement direction of the distance measurement sensors 27).

1-5. Outline of the AF Module Configuration

Figure 11:
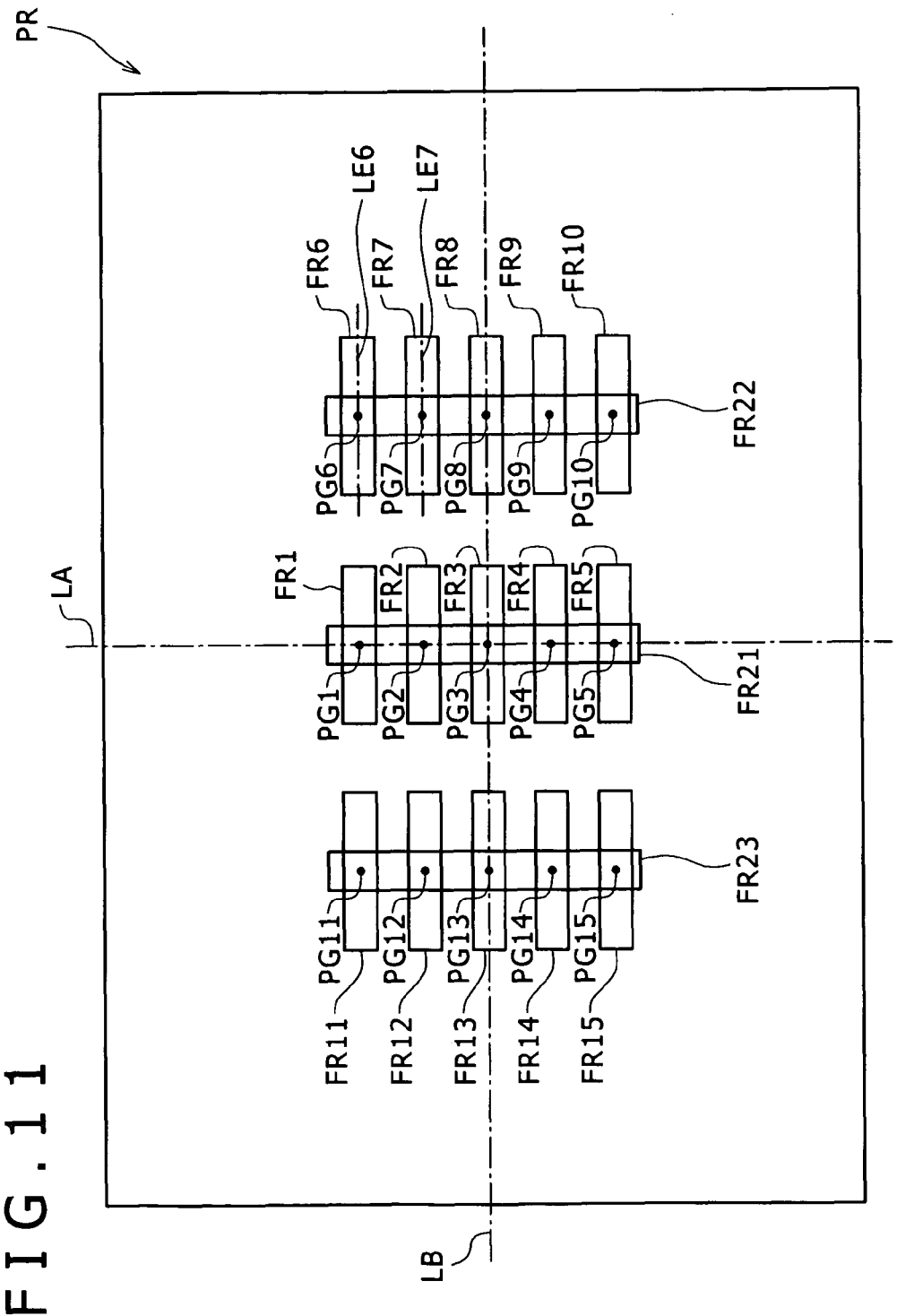
FIG. 11 is a diagram illustrating the arrangement of a plurality of distance measurement points in a shooting region.
Figure 12:
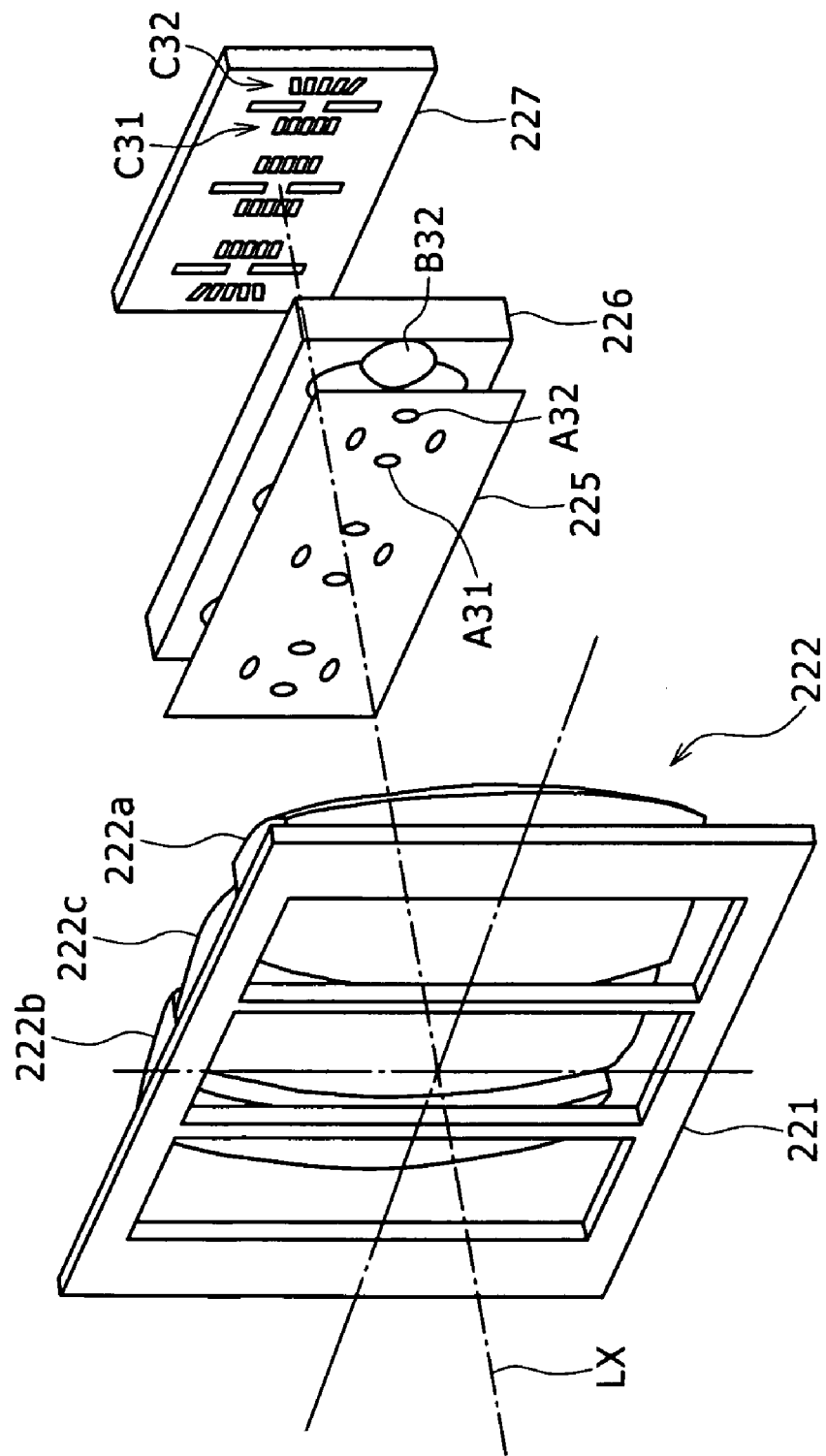
FIG. 12 is an exploded perspective view illustrating the rough configuration of an AF module.
Figure 13:
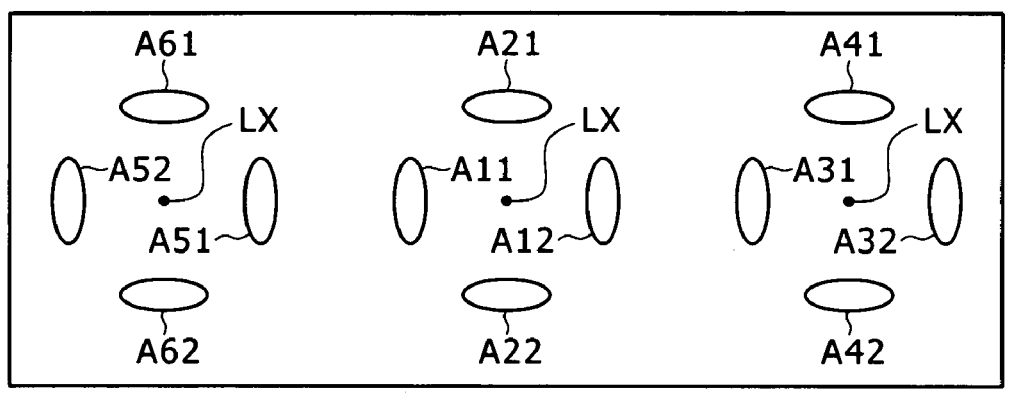
FIG. 13 is a diagram illustrating the arrangement of openings in a stop mask.
Figure 14:
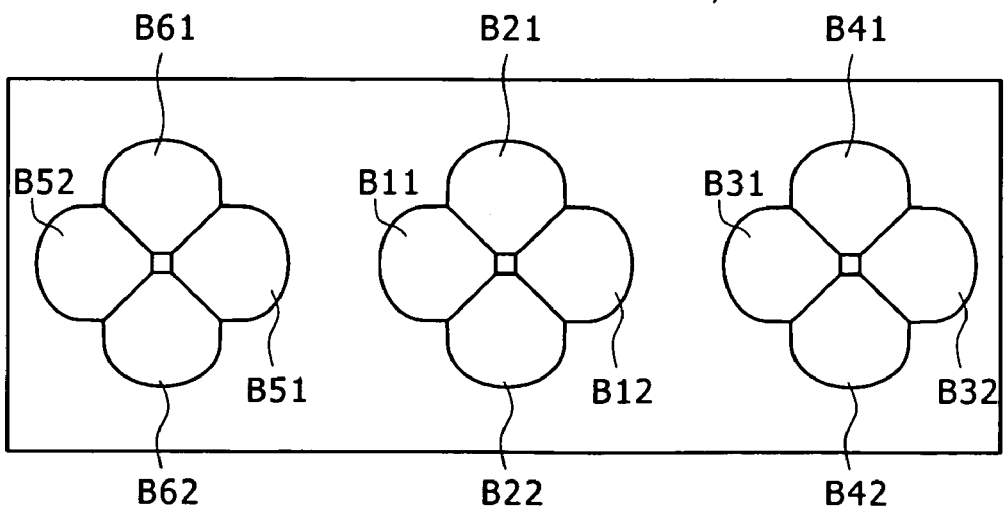
FIG. 14 is a diagram illustrating the arrangement of separator lenses in a lens array.
Figure 15:
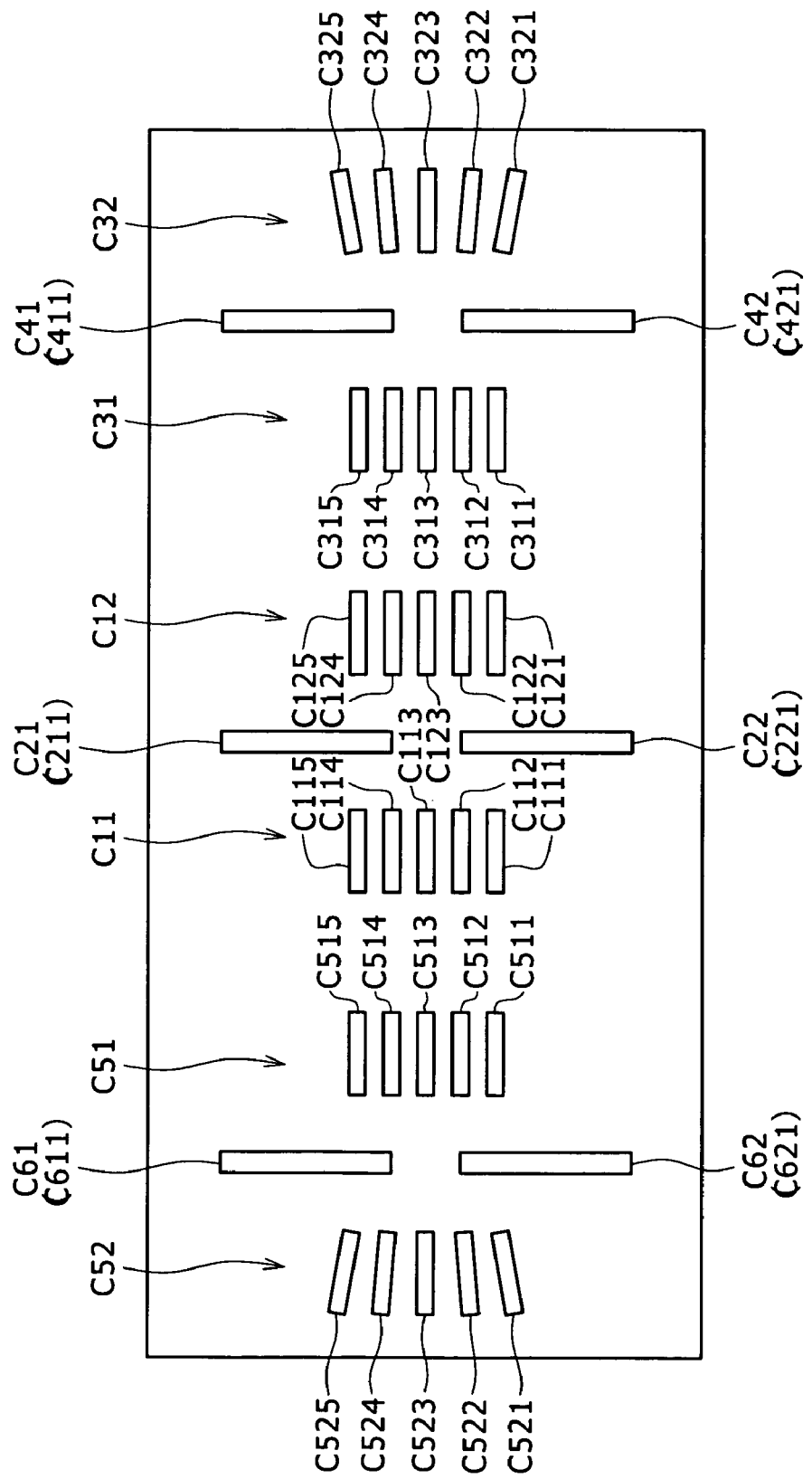
FIG. 15 is a diagram illustrating the arrangement of distance measurement sensors in a sensor chip.
Figure 16:
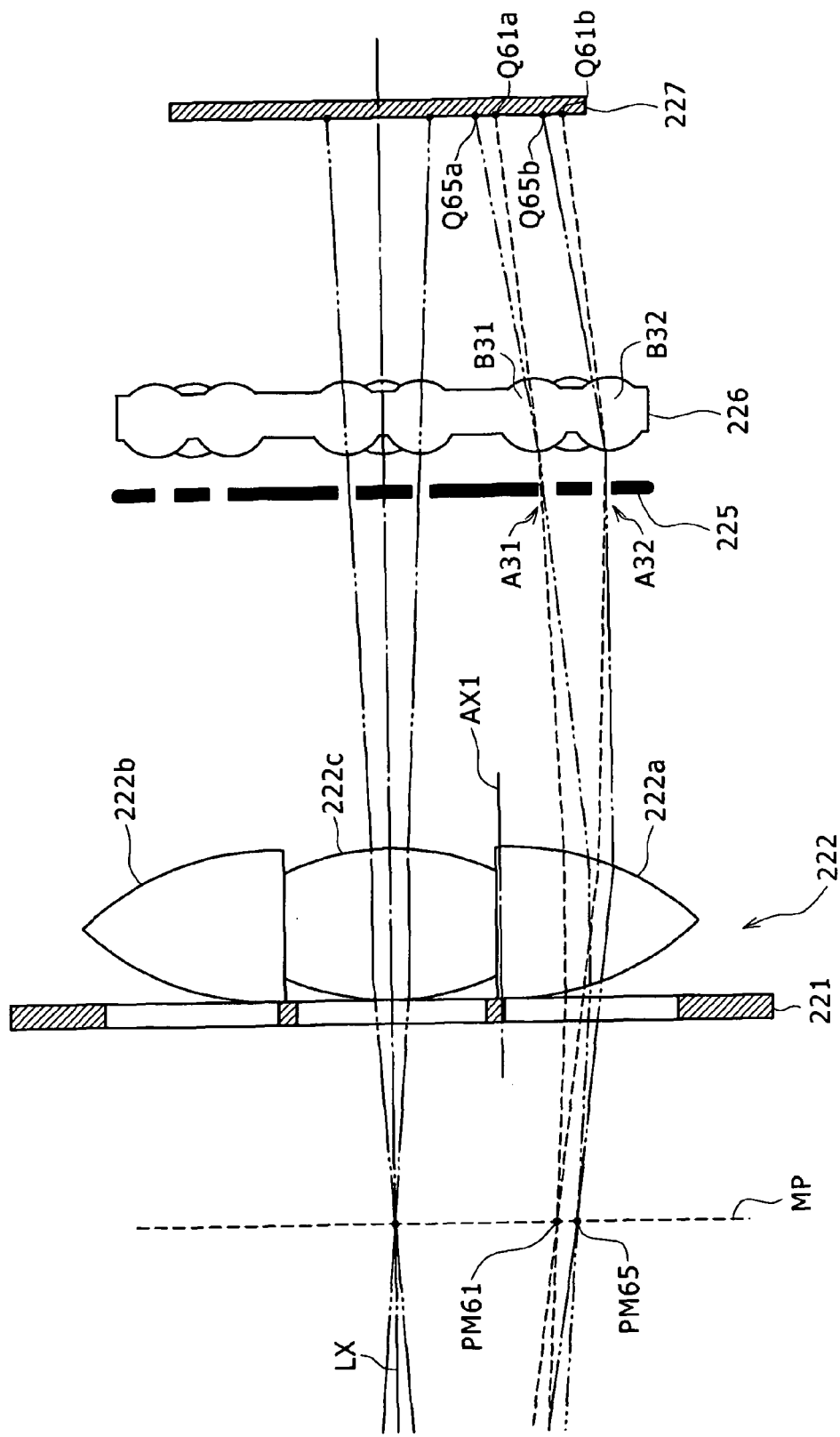
FIG. 16 is a top view of the AF module illustrating the paths of light in the AF module.

The configuration of the AF module 20 (also referred to as 20A) according to the first embodiment will be outlined with reference to FIGS. 11 to 16 and other figures. FIG. 11 is a diagram illustrating a plurality of distance measurement points PG and a plurality of focus detection regions FR in a shooting region PR. FIG. 12 is an exploded perspective view illustrating the rough configuration of the AF module 20A. FIG. 13 is a diagram illustrating the arrangement of openings in a stop mask 225 (225A). FIG. 14 is a diagram illustrating the arrangement of separator lenses in a lens array 226 (226A). FIG. 15 is a diagram illustrating the arrangement of distance measurement sensors in a sensor chip 227 (227A). Further, FIG. 16 is a top view of the AF module 20 illustrating the paths of light in the AF module 20. It should be noted that the distance measurement sensors each include a plurality of photoreceiving elements (e.g., photodiodes). For example, each of the distance-measurement sensors is configured as a CCD line sensor (one-dimensional CCD sensor array).

As illustrated in FIG. 11, a plurality of distance measurement points PGk are set in the shooting region PR of the imaging device 1. Here, a total of 15 distance measurement points PG1 to PG15 are set. Of these, the measurement point PG3 is provided at the center of the shooting region (more specifically, vertically and horizontally at the center), i.e., at the position through which the optical axis of the shooting lens passes.

Focus detection regions FR1 to FR15 are provided respectively for the distance measurement points PG1 to PG15. Each of the focus detection regions FR1 to FR15 extends horizontally from the associated measurement point as a center. As described later, distance measurement sensitive to the gray level change in the horizontal direction of the shooting region PR is accomplished using the subject images in the focus detection regions FR1 to FR15.

Further, focus detection regions FR21, FR22 and FR23 are provided for the three distance measurement points PG3, PG8 and PG13. Each of the focus detection regions FR21, FR22 and FR23 extends vertically from the associated measurement point as a center. As described later, distance measurement sensitive to the gray level change in the vertical direction of the shooting region PR is accomplished using the subject images in the focus detection regions FR21 to FR23. Both vertical and horizontal distance measurements are accomplished at the three distance measurement points PG3, PG8 and PG13 (also referred to as the cross distance measurement points).

Of the focus detection regions FR1 to FR15 and FR21 to FR23, the regions FR3, FR8 and FR13 are aligned with a reference straight line LB, and the point FR21 is aligned with a reference line LA. It should be noted that the reference line LB is a horizontal line adapted to vertically divide the shooting region PR into two equal parts, and that the reference line LA is a vertical line adapted to horizontally divide the shooting region PR into two equal parts. In other words, the reference line LB passes through the center of the shooting region PR and extends horizontally, and the reference line LA passes through the center of the shooting region PR and extends vertically.

The focus detection regions FR3, FR8 and FR13 are used for distance measurement of the subject images at the vertical center. The focus detection region FR21 is used for distance measurement of the subject image at the horizontal center.

On the other hand, the focus detection regions FR1, FR2, FR4 and FR5 are vertically spaced and displaced from the focus detection region FR3. Therefore, the focus detection regions FR1, FR2, FR4 and FR5 are used for distance measurement of the subject images displaced from the vertical center.

Similarly, the focus detection regions FR6, FR7, FR9 and FR10 are vertically spaced from the focus detection region FR8, and the focus detection regions FR11, FR12, FR14 and FR15 from the focus detection region FR13. In other words, the focus detection regions FR6, FR7, FR9 and FR10 are vertically displaced from the focus detection region FR8, and the focus detection regions FR11, FR12, FR14 and FR15 from the focus detection region FR13. These focus detection regions FR6, FR7, FR9, FR10, FR11, FR12, FR14 and FR15 are also used for distance measurement of the subject images displaced from the vertical center. It should be noted that the focus detection region FR6 is displaced more from the reference line LB than the focus detection region FR7, and that the focus detection region FR10 is displaced more from the reference line LB than the focus detection region FR9. The same relationship holds for the displacements of the focus detection regions FR11, FR12, FR14 and FR15 from the reference line LB.

On the other hand, the focus detection regions FR6 to FR10 are spaced horizontally (to the right in FIG. 11) respectively from the focus detection regions FR1 to FR5. In other words, the focus detection regions FR6 to FR10 are horizontally displaced from the horizontal center. As described above, the focus detection regions FR6, FR7, FR9 and FR10 are both vertically and horizontally displaced from the focus detection region FR3 at the center. The same regions FR6, FR7, FR9 and FR10 are used for distance measurement of the subject images displaced from the vertical and horizontal centers.

On the other hand, the focus detection regions FR11 to FR15 are spaced horizontally (to the left in FIG. 11) respectively from the focus detection regions FR1 to FR5. Therefore, the focus detection regions FR11, FR12, FR14 and FR15 are both vertically and horizontally displaced from the focus detection region FR3 at the center. The same regions FR11, FR12, FR14 and FR15 are used for distance measurement of the subject images displaced from the vertical and horizontal centers.

Further, the focus detection regions FR22 and FR23 are horizontally spaced and displaced from the focus detection region FR21. Therefore, the same regions FR22 and FR23 are used for distance measurement of the subject images displaced from the horizontal center.

As illustrated in FIG. 12, the AF module 20A includes a view field mask 221, condenser lens 222, the stop mask 225 (225A), lens array 226 (226A) and sensor chip 227 (227A). It should be noted that the AF module 20 also includes, for example, a mirror adapted to reflect the light entering the AF module 20 after being reflected by the sub-mirror 62 (FIG. 4). However, this mirror and other components are omitted for reasons of simplification.

The light from the shooting lens unit 3 is reflected by the sub-mirror 62 and forms an image at a position optically equivalent to that of the imaging element 5 and then travels further to enter the AF module 20. Next, the incident light passes through the condenser lens 222 and stop mask 225 and is collected by the lens array 226 to reach the sensor chip 227. It should be noted that not only the lens array 226 but also the condenser lens 222 are capable of collecting light. The light attempting to spread out after being reflected by the sub-mirror 62 and forming an image at a position optically equivalent to that of the imaging element 5 is collected into a limited area on the sensor chip 227 by the light collecting action of the condenser lens 222.

The condenser lens 222 includes a condenser lens group, and more specifically, three condenser lenses 222a, 222b and 222c. The condenser lens 222c at the center collects, of all the luminous fluxes from the shooting lens unit 3 (shooting optical system), those in the central region around the central axis (optical axis) LX. On the other hand, the condenser lenses 222a and 222b located on both sides are horizontally displaced (that is, eccentric) from the optical axis LX and collect the luminous fluxes in the regions at a distance from the optical axis LX.

The stop mask 225, lens array 226 and sensor chip 227 are all formed in the shape of a plate-shaped member and arranged perpendicular to the optical axis LX of the luminous fluxes from the shooting lens unit 3.

The stop mask 225 has a plurality of openings, and the lens array 226 a plurality of separator lenses. On the other hand, the sensor chip 227 has a plurality of pairs of distance measurement sensors. As described next, the openings of the stop mask 225, the separator lenses of the lens array 226 and the distance measurement sensors of the sensor chip 227 are provided at the positions associated with each other.

A description will be given next of the configurations and other characteristics of the stop mask 225, lens array 226 and sensor chip 227 with reference to FIGS. 13 to 15.

The luminous flux passing through the condenser lens 222c (FIG. 12), provided at the center of the condenser lens 222, reaches the central portion of the stop mask 225 (FIG. 13). Four openings A11, A12, A21 and A22 are provided at the central portion of the stop mask 225. Further, four separator lenses B11, B12, B21 and B22 are provided at the central portion of the lens array 226 (FIG. 14). Still further, four distance measurement sensor groups C11, C12, C21 and C22 are provided at the central portion of the sensor chip 227 (FIG. 15). The four openings A11, A12, A21 and A22, four separator lenses B11, B12, B21 and B22, and four distance measurement sensor groups C11, C12, C21 and C22 are provided at the positions respectively associated with each other. It should be noted that the distance measurement sensor groups C11 and C12 make up a pair of distance measurement sensor groups C10, and the distance measurement sensor groups C21 and C22 a pair of distance measurement sensor groups C20. The pairs of distance measurement sensor groups C10 and C20 each have a distance measurement sensor pair for the subject near the center of the screen.

The light which has passed through the condenser lens 222c and opening A11 (FIG. 13) is collected by the separator lens B11 (FIG. 14) to reach the distance measurement sensor group C11 (FIG. 15). The distance measurement sensor group C11 includes a plurality (five in this case) of distance measurement sensors C111 to C115 (FIG. 15). The same sensors C111 to C115 receive light from the positions of the subject respectively associated with the distance measurement points PG1 to PG5 (FIG. 11). More specifically, the same sensors C111 to C115 receive, respectively, the luminous fluxes for the subject images in the focus detection regions FR1 to FR5.

On the other hand, the light which has passed through the condenser lens 222c and opening A12 is collected by the separator lens B12 to reach the distance measurement sensor group C12 (FIG. 15). The distance measurement sensor group C12 includes a plurality (five in this case) of distance measurement sensors C121 to C125 (FIG. 16). The same sensors C121 to C125 receive light from the positions of the subject respectively associated with the distance measurement points PG1 to PG5 (FIG. 11). More specifically, the same sensors C121 to C125 receive, respectively, the luminous fluxes for the subject images in the focus detection regions FR1 to FR5.

The luminous fluxes reaching the pair of distance measurement sensor groups C11 and C12 allow for phase difference distance measurement based on the above principle.

For example, the luminous flux for the focus detection region FR3 is divided. The divided beams are received by the pair of distance measurement sensors C113 and C123. Then, the distance measurement for the distance measurement point PG3 is performed using the luminous fluxes which have reached the pair of distance measurement sensors C113 and C123.

Similarly, the luminous flux for the focus detection region FR1 is divided. The divided beams are received by the pair of distance measurement sensors C111 and C121. Then, the distance measurement for the distance measurement point PG1 is performed using the luminous fluxes which have reached the pair of distance measurement sensors C111 and C121.

Further, the luminous flux for the focus detection region FR2 is divided. The divided beams are received by the pair of distance measurement sensors C112 and C122. Then, the distance measurement for the distance measurement point PG2 is performed using the luminous fluxes which have reached the pair of distance measurement sensors C112 and C122.

The same is true for the luminous fluxes for the focus detection regions FR4 and FR5.

As described above, the distance measurement for the distance measurement point PGk ($k=1, 2, \ldots, 5$) is performed using the luminous fluxes which have reached the pair of distance measurement sensors C11$k$ and C12$k$. It should be noted that the pair of distance measurement sensor groups C11 and C12 provide distance measurement sensitive to the gray level change in the horizontal direction of the subject images (arrangement direction of the distance measurement sensor groups C11 and C12).

Similarly, the light which has passed through the condenser lens 222c and opening A21 is collected by the separator lens B21 to reach the distance measurement sensor group C21. Further, the light which has passed through the condenser lens 222c and opening A22 is collected by the separator lens B22 to reach the distance measurement sensor group C22. Here, we assume that the distance measurement sensor group C21 includes a single distance measurement sensor C211, and the distance measurement sensor group C22 a single distance measurement sensor C221. The distance measurement sensors C211 and C221 receive the divided luminous fluxes for the subject image in the focus detection region FR21. The luminous fluxes reaching the pair of distance measurement sensors C211 and C221 also allow for phase difference distance measurement based on the above principle. It should be noted that the pair of distance measurement sensors C211 and C221 provide distance measurement sensitive to the gray level change in the vertical direction of the subject images (arrangement direction of the distance measurement sensors C211 and C221).

Further, in the present embodiment, the luminous fluxes which have passed through the left and right condenser lenses 222a and 222b reach the left and right sides of the stop mask 225.

As illustrated in FIG. 13, four openings A31, A32, A41 and A42 are provided in the right portion of the stop mask 225, and four openings A51, A52, A61 and A62 in the left portion of the stop mask 225. Further, as illustrated in FIG. 14, four separator lenses B31, B32, B41 and B42 are provided in the right portion of the lens array 226, and four separator lenses B51, B52, B61 and B62 in the left portion of the lens array 226. Still further, as illustrated in FIG. 15, four distance sensor groups C31, C32, C41 and C42 are provided in the right portion of the sensor chip 227, and four distance sensor groups C51, C52, C61 and C62 in the left portion of the sensor chip 227.

The four openings A31, A32, A41 and A42, the four separator lenses B31, B32, B41 and B42, and the four distance sensor groups C31, C32, C41 and C42 on the right are provided at the positions associated with each other. Similarly, the four openings A51, A52, A61 and A62, the four separator lenses B51, B52, B61 and B62 and the four distance sensor groups C51, C52, C61 and C62 on the left are provided at the positions associated with each other.

It should be noted that the distance sensor groups C31 and C32 make up a pair of distance measurement sensor groups C30, and the distance measurement sensor groups C51 and C52 a pair of distance measurement sensor groups C50. Further, the distance sensor groups C41 and C42 make up a pair of distance measurement sensor groups C40, and the distance measurement sensor groups C61 and C62 a pair of distance measurement sensor groups C60. The pairs of distance measurement sensor groups C30, C50, C40 and C60 each have a distance measurement sensor pair for the subject at a distance from the center of the screen.

The light which has passed through the condenser lens 222*a* on the front in FIG. 12 and opening A31 is collected by the separator lens B31 to reach the distance measurement sensor group C31. Further, the light which has passed through the condenser lens 222*a* and opening A32 is collected by the separator lens B32 to reach the distance measurement sensor group C32. The luminous fluxes reaching the pair of distance measurement sensor groups C31 and C32 also allow for phase difference distance measurement based on the above principle. It should be noted that the pair of distance measurement sensor groups C31 and C32 provide distance measurement sensitive to the gray level change in the horizontal direction of the subject images (arrangement direction of the distance measurement sensor groups C31 and C32).

Still further, the light which has passed through the condenser lens 222*a* and opening A41 is collected by the separator lens B41 to reach the distance measurement sensor group C41. Still further, the light which has passed through the condenser lens 222*a* and opening A42 is collected by the separator lens B42 to reach the distance measurement sensor group C42. The luminous fluxes reaching the pair of distance measurement sensor groups C41 and C42 also allow for phase difference distance measurement based on the above principle. It should be noted that the pair of distance measurement sensor groups C41 and C42 provide distance measurement sensitive to the gray level change in the vertical direction of the subject images (arrangement direction of the distance measurement sensor groups C41 and C42).

Similarly, the light which has passed through the condenser lens 222*b* on the left and opening A51 is collected by the separator lens B51 to reach the distance measurement sensor group C51. Further, the light which has passed through the condenser lens 222*b* on the left and opening A52 is collected by the separator lens B52 to reach the distance measurement sensor group C52. The luminous fluxes reaching the pair of distance measurement sensor groups C51 and C52 also allow for phase difference distance measurement based on the above principle. It should be noted that the pair of distance measurement sensor groups C51 and C52 provide distance measurement sensitive to the gray level change in the horizontal direction of the subject images (arrangement direction of the distance measurement sensor groups C51 and C52).

Still further, the light which has passed through the condenser lens 222*b* and opening A61 is collected by the separator lens B61 to reach the distance measurement sensor group C61. Still further, the light which has passed through the condenser lens 222*b* and opening A62 is collected by the separator lens B62 to reach the distance measurement sensor group C62. The luminous fluxes reaching the pair of distance measurement sensor groups C61 and C62 also allow for phase difference distance measurement based on the above principle. It should be noted that the pair of distance measurement sensor groups C61 and C62 provide distance measurement sensitive to the gray level change in the vertical direction of the subject images (arrangement direction of the distance measurement sensor groups C61 and C62).

Each of these pairs of distance measurement sensor groups C30, C40, C50 and C60 provides a defocus amount (distance measurement result) of the subject at the portions other than the center of the screen.

As described above, the AF module 20 provides subject distances associated with a plurality of focus points in the screen, that is, permits distance measurement of a plurality of portions of the subject. Further, if a plurality of different distance measurement results are obtained, the AF module 20 allows for proper AF operation based on the plurality of distance measurement results. For example, it is only necessary to perform AF control in such a manner as to bring the subject closest to the imaging device 1 into focus (also referred to as the "closest subject priority" control). The closest subject priority control makes it possible to bring subjects located at a variety of positions in the screen into proper focus.

1-6. Distance Measurement for Off-Axis Focus Detection Regions

A detailed description will be given next of distance measurement in the off-axis regions (regions off the optical axis LX of the shooting lens unit 3). In the imaging device 1, the AF module 20 and other components are laterally symmetrical in structure. In the description given below, the off-axis regions on the right will be described. However, the same is true for the off-axis regions on the left.

Figure 17:
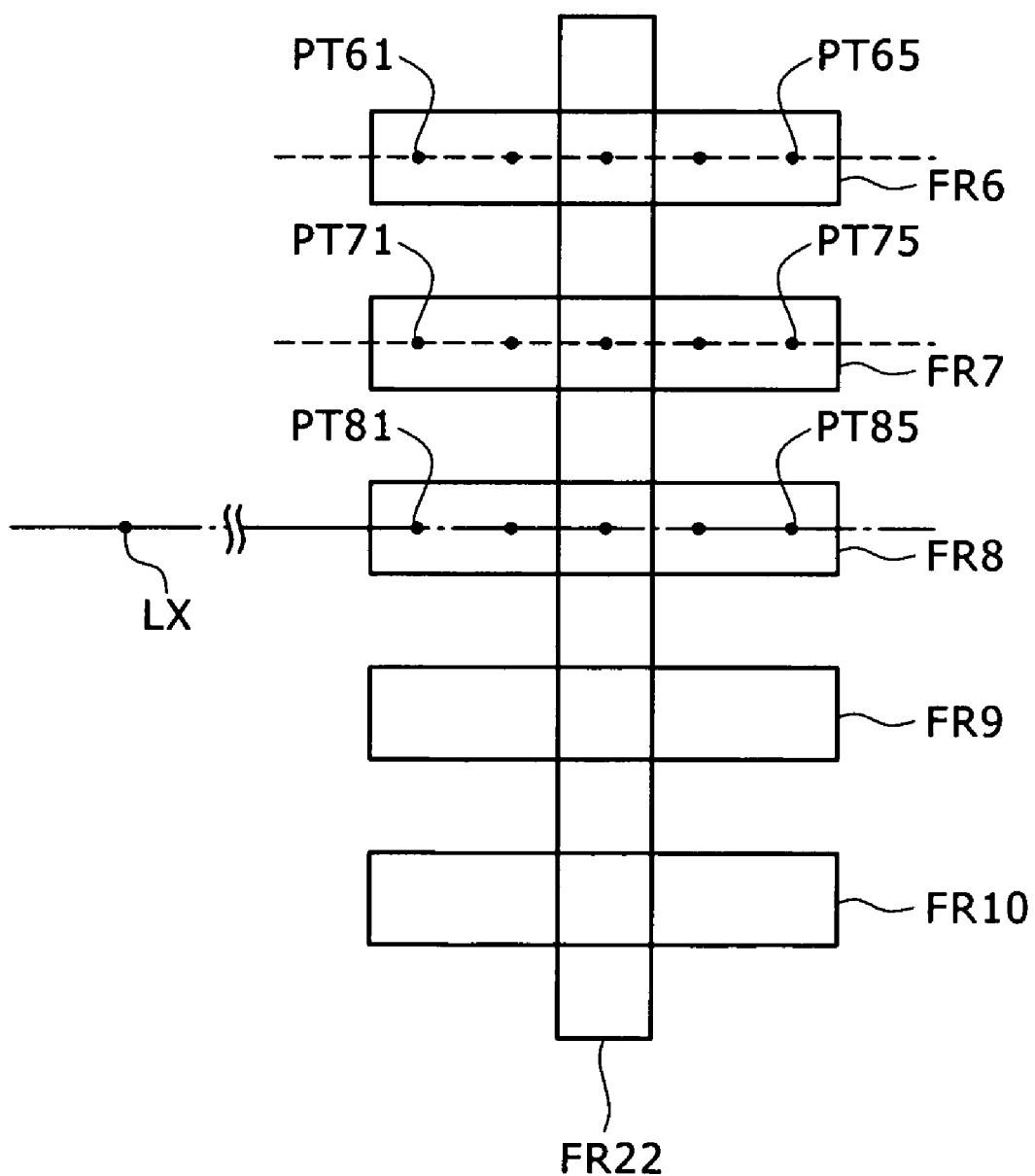
FIG. 17 is a diagram primarily illustrating the focus detection regions on the right-hand side of FIG. 11.
Figure 18:
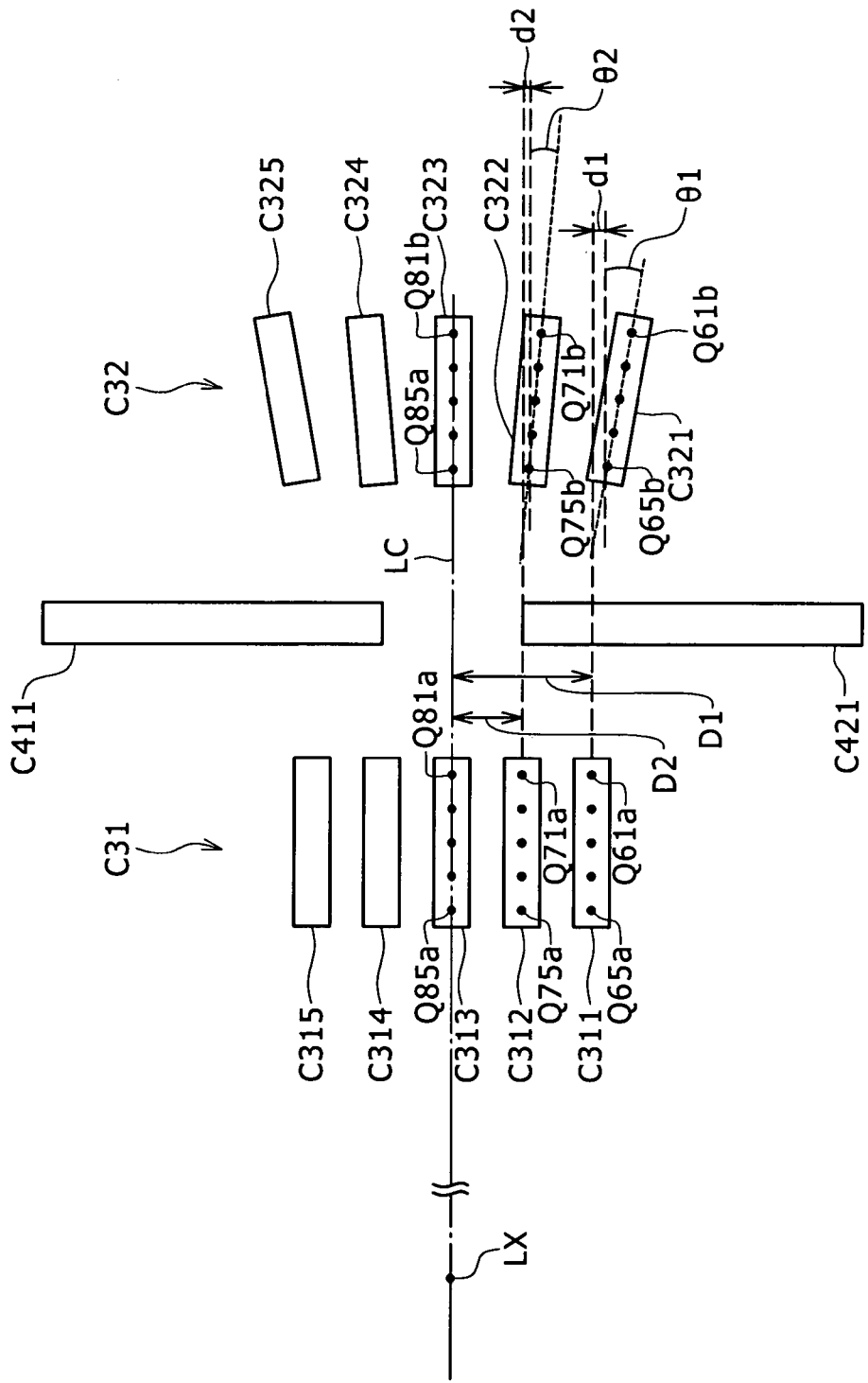
FIG. 18 is a diagram illustrating the distance measurement sensor groups on the right-hand side of FIG. 15.

FIG. 17 is a diagram illustrating the focus detection regions FR6 to FR10 on the right-hand side of FIG. 11. FIG. 18 is a diagram illustrating the distance measurement sensor groups C31 and C32 and other sensor groups on the right-hand side of FIG. 15. As illustrated in FIG. 11, the focus detection regions FR6 to FR10 are located off the center of the shooting region PR horizontally to the right. It should be noted that the horizontal subject image in the focus detection regions FR of the shooting region PR in FIG. 11 is ideally divided horizontally by the sensor chip 227 shown in FIG. 15. Therefore, the horizontal direction in the shooting region PR is associated with that in the sensor chip 227. Similarly, the vertical subject image in the focus detection regions FR of the shooting region PR is ideally divided vertically by the sensor chip 227. Therefore, the vertical direction in the shooting region PR is associated with that in the sensor chip 227. When located forward (toward the front) of the image forming point of the shooting lens, on the other hand, the subject image is flipped both vertically and horizontally as it travels. For reasons of convenience of illustration, however, the subject image is flipped only vertically in FIGS. 11 (17) and 15 (18).

As described above, the luminous fluxes reaching the pair of distance measurement sensor groups C31 and C32 allow for phase difference distance measurement.

For example, the luminous flux for the focus detection region FR8 is divided. The divided beams are received by the pair of distance measurement sensors C313 and C323. Then, the distance measurement for the distance measurement point PG8 is performed using the luminous fluxes which have reached the pair of distance measurement sensors C313 and C323.

Similarly, the luminous flux for the focus detection region FR7 is divided. The divided beams are received by the pair of distance measurement sensors C312 and C322. Then, the distance measurement for the distance measurement point PG7 is performed using the luminous fluxes which have reached the pair of distance measurement sensors C312 and C322.

Further, the luminous flux for the focus detection region FR6 is divided. The divided beams are received by the pair of distance measurement sensors C311 and C321. Then, the distance measurement for the distance measurement point PG6 is performed using the luminous fluxes which have reached the pair of distance measurement sensors C311 and C321.

The same is true for the luminous fluxes for the focus detection regions FR9 and FR10.

As described above, the distance measurement for the distance measurement points PG6 to PG10 (k=1, 2, ..., 5) is performed using the luminous fluxes which have reached the pair of distance measurement sensors C31k and C32k. It should be noted that the pair of distance measurement sensor groups C31k and C32k provide distance measurement sensitive to the gray level change in the horizontal direction of the subject images (arrangement direction of each pair of the distance measurement sensors C31k and C32k).

Here, a description will be given of the paths of light in the focus detection regions FR6 to FR10 shown in FIG. 17 also with reference to the top view shown in FIG. 16.

The luminous flux for a point PT61 (FIG. 17) on the side close to the optical axis LX in the focus detection region FR8 forms an image at a point PM61 of an image forming surface MP once and passes through the opening portions of the view field mask 221 and the condenser lens 222a as shown in FIG. 16. Then, one part of the luminous flux for the point PT61 passes through the opening portion A31 of the stop mask 225 and the separator lens B31 of the lens array 226 to reach a point Q61a (FIG. 18) in the distance measurement sensor C311 of the sensor chip 227. On the other hand, the other part of the luminous flux for the point PT61 passes through the opening portion A32 of the stop mask 225 and the separator lens B32 of the lens array 226 to reach a point Q61b (FIG. 18) in the distance measurement sensor C321 of the sensor chip 227.

As described above, the luminous flux for the point PT61 (FIG. 17) is divided into two parts, and these parts reach the point Q61a in the distance measurement sensor C311 and the point Q61b in the distance measurement sensor C321, respectively.

On the other hand, the luminous flux for a point PT65 (FIG. 17) on the side far from the optical axis LX in the focus detection region FR8 forms an image at a point PM65 of the image forming surface MP once and passes through the opening portions of the view field mask 221 and the condenser lens 222a as shown in FIG. 16. Then, one part of the luminous flux for the point PT65 passes through the opening portion A31 of the stop mask 225 and the separator lens B31 of the lens array 226 to reach a point Q65a in the distance measurement sensor C311 of the sensor chip 227. On the other hand, the other part of the luminous flux for the point PT65 passes through the opening portion A32 of the stop mask 225 and the separator lens B32 of the lens array 226 to reach a point Q65b in the distance measurement sensor C321 of the sensor chip 227.

As described above, the luminous flux for the point PT65 (FIG. 17) is divided into two parts, and these parts reach the point Q65a in the distance measurement sensor C311 and the point Q65b in the distance measurement sensor C321, respectively.

Similarly, the luminous flux for each of the points between the points PT61 and PT65 in the focus detection region FR8 is divided into two parts, and these parts reach a point between the points Q61a and Q65a in the distance measurement sensor C311 and a point between the points Q61b and Q65b in the distance measurement sensor C321.

As described above, the luminous flux for each of the points between the points PT61 and PT65 in the focus detection region FR8 is divided into two parts, and these parts reach an associated point in the distance measurement sensor C311 and another in the distance measurement sensor C321. The focus lens position is found based on the displacement between the light images in the distance measurement sensors C311 and C321. It should be noted that, as illustrated in FIG. 16, both of the luminous fluxes reaching the distance measurement sensors C311 and C321 pass below (on the same side of) an optical axis AX1 of the condenser lens 222a. In other words, both of the luminous fluxes pass outward from the optical axis AX1 (on the side opposite to that of the optical axis LX) in the plane including the optical axes AX1 and LX.

A detailed description will be given next of the distance measurement sensor groups C31 and C32.

As illustrated in FIG. 18, the paired distance measurement sensors C313 and C323 are horizontally spaced from each other on the sensor arrangement surface of the sensor chip 227. More specifically, the distance measurement sensors C313 and C323 are arranged along a line LC. Here, the line LC extends horizontally from the center of the sensor chip 227 (more specifically, the intersection between the sensor chip 227 and optical axis LX) on the sensor arrangement surface.

Further, the paired distance measurement sensors C312 and C322 are also horizontally spaced from each other on the sensor arrangement surface of the sensor chip 227. It should be noted, however, that the paired distance measurement sensors C312 and C322 are arranged in a different manner from the paired distance measurement sensors C313 and C323.

More specifically, the distance measurement sensor C312 is arranged downward in FIG. 18 at a distance D2 from and parallel to the distance measurement sensor C313 (also parallel to the line LC). On the other hand, the distance measurement sensor C322 is arranged downward in FIG. 18 at a distance (D2+d2) from the distance measurement sensor C323 in the vertical direction in FIG. 18. In other words, the distance measurement sensor C322 is shifted more downward than the distance measurement sensor C312 by the distance d2 in the vertical direction. Further, the distance measurement sensor C322 is rotated clockwise by a predetermined angle θ2 relative to the distance measurement sensors C313, C323 and C312 and the line LC.

As described above, the paired distance measurement sensors C312 and C322 are horizontally spaced from each other and arranged at different vertical positions on the sensor arrangement surface of the sensor chip 227. Further, the paired distance measurement sensors C312 and C322 are arranged at different angles (angles relative to the horizontal direction) on the sensor arrangement surface.

Similarly, in the arrangement surface of the sensor chip 227, the paired distance measurement sensors C311 and C321 are horizontally spaced from each other and arranged in a different manner from the paired distance measurement sensors C313 and C323.

More specifically, the distance measurement sensor C311 is arranged downward in FIG. 18 at a distance D1 (>D2) from and parallel to the distance measurement sensor C313 (also parallel to the line LC). On the other hand, the distance measurement sensor C321 is arranged downward in FIG. 18 at a distance (D1+d1) from the distance measurement sensor C323 in the vertical direction in FIG. 18. In other words, the distance measurement sensor C321 is shifted more downward than the distance measurement sensor C311 by the distance d1 in the vertical direction. Further, the distance measurement sensor C321 is rotated by a predetermined angle θ1 relative to the distance measurement sensors C313, C323 and C311 and the line LC. Here, the distance D1 is greater than the distance D2, and the distance d1 is greater than the distance d2. On the other hand, the angle θ1 is greater than the angle θ2.

As described above, the paired distance measurement sensors C311 and C321 are horizontally spaced from each other and arranged at different vertical positions on the sensor arrangement surface of the sensor chip 227. Further, the paired distance measurement sensors C311 and C321 are arranged at different angles (angles relative to the horizontal direction) on the sensor arrangement surface.

Still similarly, sensors of a plurality of other distance measurement sensor pairs (C314 and C324) and (C315 and C325) are horizontally spaced from each other on the sensor arrangement surface of the sensor chip 227. In particular, the paired distance measurement sensors C314 and C324 are arranged at different vertical positions and different angles on the sensor arrangement surface of the sensor chip 227. Similarly, the paired distance measurement sensors C315 and C325 are arranged at different vertical positions and different angles on the sensor arrangement surface of the sensor chip 227. It should be noted that the arrangement of the paired distance measurement sensors C314 and C324 and that of the paired distance measurement sensors C312 and C322 are line symmetrical with respect to the line LC. Similarly, the arrangement of the paired distance measurement sensors C315 and C325 and that of the paired distance measurement sensors C311 and C321 are line symmetrical with respect to the line LC.

Figure 19:
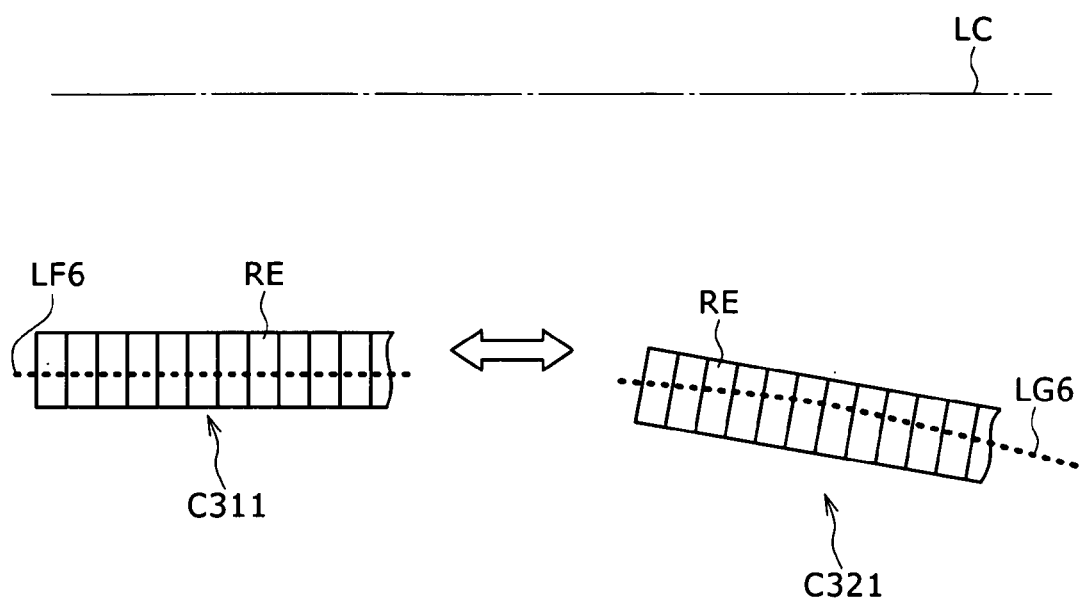
FIG. 19 is a diagram illustrating the arrangement of a photoreceiving element array in the distance measurement sensor.

On the other hand, FIG. 19 is a diagram illustrating the arrangement of a photoreceiving element array in the distance measurement sensor C321. As illustrated in FIG. 19, the photoreceiving element array in the distance measurement sensor C321 is arranged in a different direction from the photoreceiving element array in the distance measurement sensor C311. The photoreceiving element array of the distance measurement sensor C321 is rotated clockwise by the angle $\theta 1$ relative to the line LC rather than being arranged parallel to the line LC.

More specifically, each of a plurality of photoreceiving elements RE in the distance measurement sensor C321 is inclined by the angle $\theta 1$ relative to each of a plurality of photoreceiving elements in the distance measurement sensor C311 and arranged along the line inclined by the angle $\theta 1$ relative to the line LC. In FIG. 19, each of the plurality of photoreceiving elements RE is shown in a narrow rectangle shape.

The same is true for other distance measurement sensors such as the sensor C322.

Here, the arrangement of the distance measurement sensors as illustrated in FIG. 18 provides reduced impact of distortion as described below. A description thereof will be given below.

Figure 20:
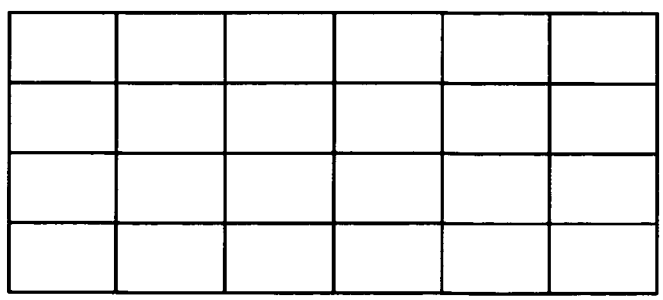
FIG. 20 is a conceptual diagram illustrating a light image before passing through a condenser lens.
Figure 21:
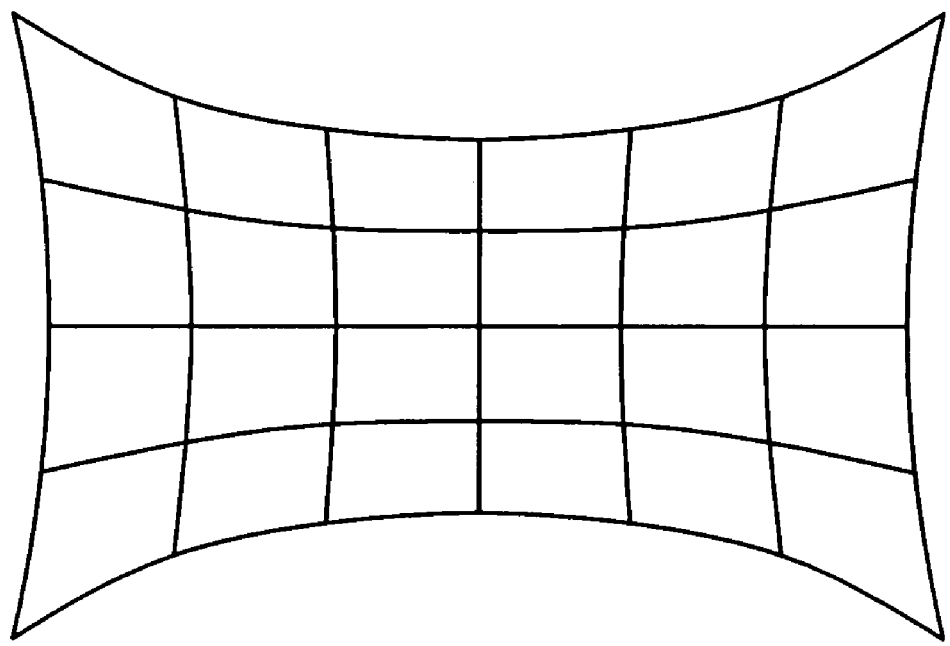
FIG. 21 is a conceptual diagram illustrating a light image after passing through the condenser lens.

FIG. 20 is a conceptual diagram illustrating a light image before passing through the condenser lens 222. FIG. 21 is a conceptual diagram illustrating a light image which has reached the sensor chip 227 after passing through the condenser lens 222. These figures show that the points on the lines in the form of a grid in FIG. 20 are projected to the points on the curves as shown in FIG. 21. Thus, the condenser lens 222 gives rise to distortion. Here, a so-called "pincushion" distortion is shown.

Figure 29:
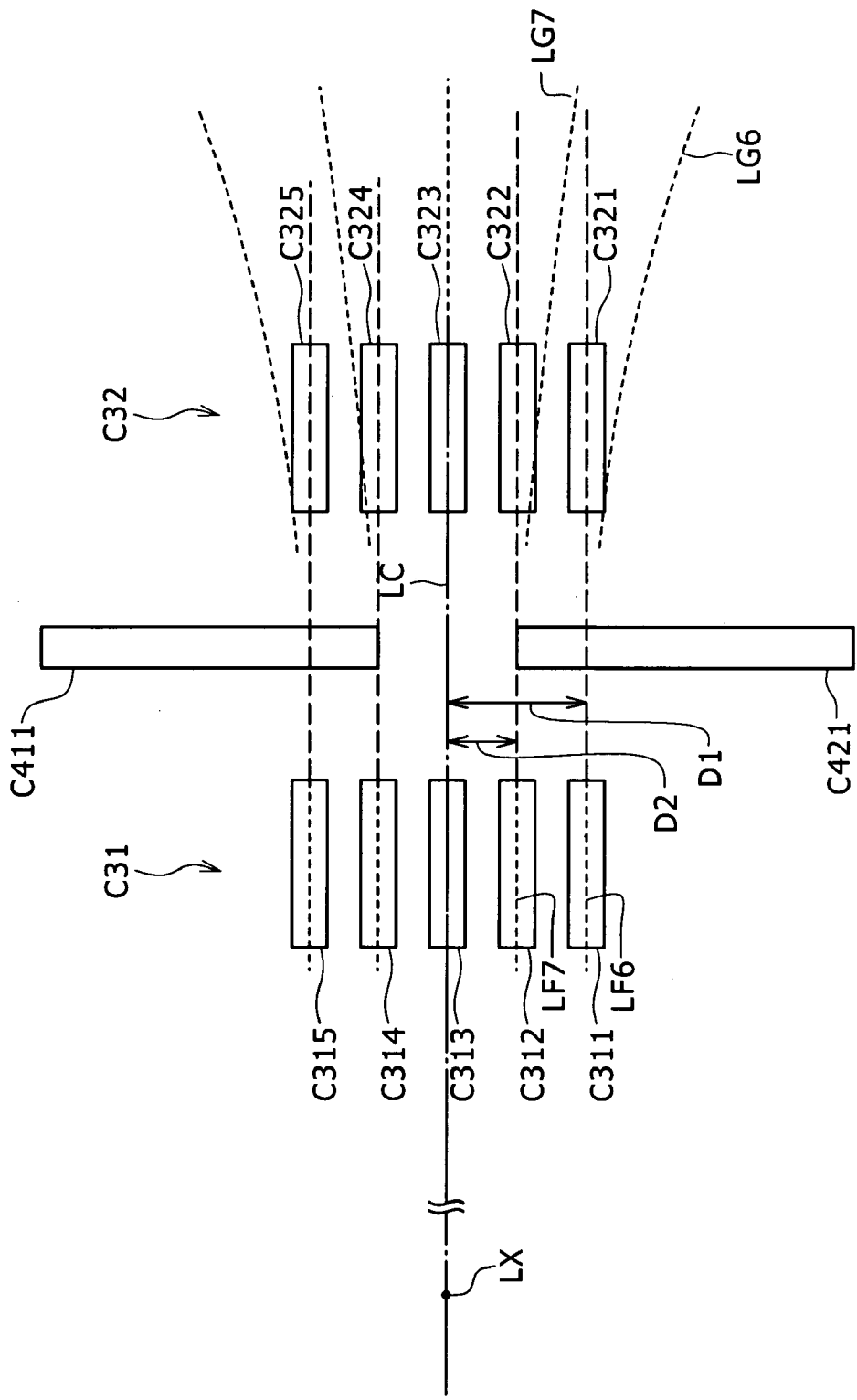
FIG. 29 is a diagram illustrating the arrangement of the distance measurement sensor group according to a comparative example.

Assuming that the arrangement according to a comparative example shown in FIG. 29 is used rather than the arrangement shown in FIG. 18, the following problem occurs. That is, the image in a focus detection region FRi does not reach the distance measurement sensors of the sensor chip 227 due to the above-described distortion. This makes it impossible to obtain a correct light image for the focus detection region FRi, thus resulting in reduced AF accuracy.

For example, the light from the points on a line LE6 (refer to FIG. 11) in the focus detection region FR6 reaches curves LF6 and LG6 as illustrated in FIG. 29 due to the above-described distortion. However, the distance measurement sensor C321 according to the arrangement of FIG. 29 is displaced from the curve LG6. This shows that the image in the focus detection region FR6 fails to properly reach the distance measurement sensor C321. In this case, a correct light image for the focus detection region FR6 cannot be obtained by the distance measurement sensor C321, thus resulting in reduced AF accuracy for the same region FR6.

Figure 22:
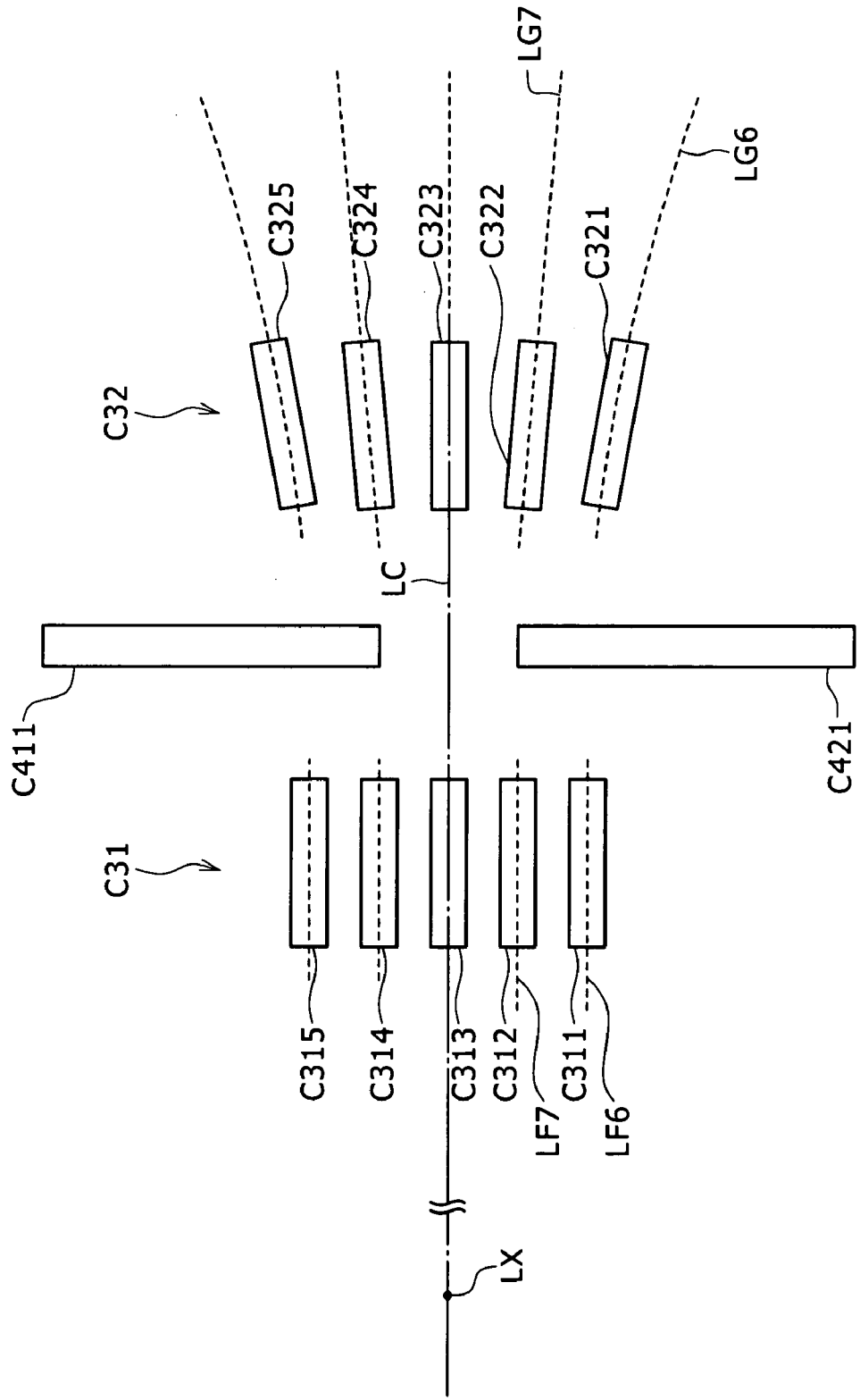
FIG. 22 is a diagram illustrating a distortion curve superimposed on the diagram shown in FIG. 18.

In the arrangement of the above embodiment (refer to FIG. 18), on the other hand, the distance measurement sensor C321 is arranged along the curve LG6 (more specifically, at an angle along the curve LG6) as illustrated in FIG. 22. The same sensor C321 is located on the curve LG6. Therefore, the image in the focus detection region FR6 can properly reach the distance measurement sensor C321. As a result, the light from the points on the line LE6 in the region FR6 can be properly received by the same sensor C321. This completely eliminates or suppresses the impact of the above-described distortion, thus suppressing the decline in AF accuracy. It should be noted that FIG. 22 is a diagram illustrating the curves LF6 and LG6 superimposed on the arrangement shown in FIG. 18.

As described above, the luminous flux on the line LE6 of the focus detection region FR6 is bent by the condenser lens 222a to reach the curves (also referred to as the distortion curves) LF6 and LG6 on the sensor arrangement surface of the sensor chip 227. Further, of the paired distance measurement sensors C311 and C321, the sensor C321 is arranged on the distortion curve LG6 (more specifically, approximately along the same curve LG6) on the sensor arrangement surface of the sensor chip 227. Still further, the sensor C311 is arranged on the distortion curve LF6 (more specifically, approximately along the same curve LF6) on the sensor arrangement surface of the sensor chip 227. As a result, both of the paired distance measurement sensors C311 and C321 can properly receive the associated images. This completely eliminates or suppresses the impact of the above-described distortion, thus suppressing the decline in AF accuracy.

In the arrangement of FIG. 18, on the other hand, the angle $\theta 1$ at which the distance measurement sensor C321 is arranged is greater than the angle $\theta 2$ at which the distance measurement sensor C322 is arranged. In other words, the relative angle $\theta 1$ between the paired distance measurement sensors C311 and C321 is greater than the relative angle $\theta 2$ between the paired distance measurement sensors C312 and C322. As described above, the farther the sensors of the distance measurement sensor group C32 are from the line LC, the greater the angle at which the sensors are arranged relative to the line LC should be. In other words, the farther the distance measurement sensors are from the line LC, the greater the relative angle between the sensors should be. This ensures more proper reduction of the impact of distortion.

In the arrangement of FIG. 18, on the other hand, the shifted distance d1 of the distance measurement sensor C321 is greater than the shifted distance d2 of the distance measurement sensor C322. In other words, the vertical positional displacement d1 between the paired distance measurement sensors C311 and C321 is greater than the vertical positional displacement d2 between the paired distance measurement sensors C312 and C322. As described above, the farther the sensors of the distance measurement sensor group C32 are from the line LC, the more shifted the sensors should be. In other words, the farther the distance measurement sensors are from the line LC, the more positionally displaced the sensors should be. This ensures more proper reduction of the impact of distortion.

In the arrangement of FIG. 18 (FIG. 22), it is assumed that the amounts of displacement (positional and angular displacements) of the distance measurement sensor C311 from the line LF6 are relatively small. However, the arrangement as shown in FIG. 18 is applicable not only to the condition described above but also to other conditions. For example, the arrangement as shown in FIG. 18 is also effective even if the amounts of displacement of the distance measurement sensor C311 from the line LF6 are relatively large.

2. Second Embodiment

In the first embodiment, a case was shown in which the distance measurement sensor group C32 was arranged differently from that in FIG. 29 and in which the distance measurement sensor group C31 was arranged in the same manner as that in FIG. 29. However, the present invention is not limited thereto. For example, the arrangement of the distance measurement sensor group C31 may be changed in accordance with the arrangement of the distance measurement sensor group C32. In the second embodiment, such a modification example will be described.

In the second embodiment, the arrangements of both the distance measurement sensor groups C31 and C32 are changed. This makes it possible for the distance measurement sensor group C31 to receive the light images from the focus detection regions FR6 to FR10 with more accuracy. As a result, more accurate AF operation can be accomplished based on the subject image in a predetermined direction of the associated focus detection region.

Figure 23:
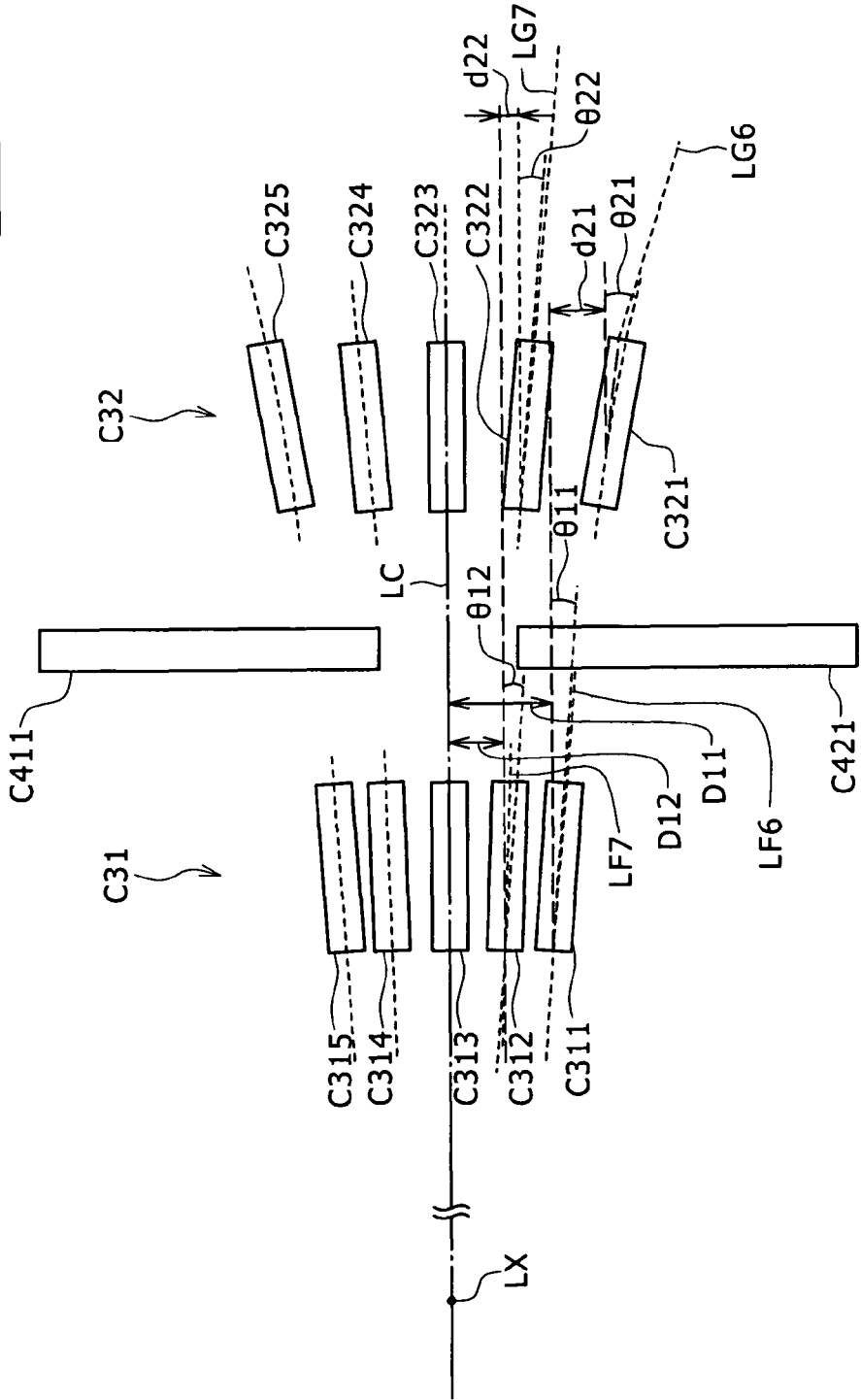
FIG. 23 is a diagram illustrating part of the sensor chip according to a second embodiment.

FIG. 23 is a diagram illustrating part of the sensor chip 227 (227B) according to the second embodiment.

As illustrated in FIG. 23, in the second embodiment, the distance measurement sensor group C32 is arranged in the same manner as in the first embodiment.

On the other hand, the distance measurement sensor group C31 is arranged differently from that in the first embodiment. More specifically, the sensors C311, C312, C314 and C315 of the distance measurement sensor group C31 are also inclined relative to the line LC.

For example, the distance measurement sensor C312 is arranged on and along a curve LF7, and the distance measurement sensor C322 is arranged on and along a curve LG7.

More specifically, the distance measurement sensor C312 is shifted downward from the distance measurement sensor C313 by a distance D12 in the vertical direction of FIG. 23. Further, the distance measurement sensor C322 is shifted downward from the distance measurement sensor C323 by a distance (D12+d22) in the vertical direction of FIG. 23. In other words, the distance measurement sensor C322 is arranged more downward than the distance measurement sensor C312 by the distance d22 in the vertical direction. Here, a distance D11 is greater than the distance D12, and a distance d21 is greater than the distance d22.

Further, the distance measurement sensor C312 is rotated by an angle θ12 relative to the distance measurement sensor C313 and line LC, and the distance measurement sensor C322 by an angle θ22 relative to the distance measurement sensor C313 and line LC. Here, the angle θ22 is greater than the angle θ12.

As described above, the paired distance measurement sensors C312 and C322 are horizontally spaced from each other and arranged at different angles on the sensor arrangement surface of the sensor chip 227. Further, the same sensors C312 and C322 are arranged at different vertical positions on the sensor arrangement surface.

In such an arrangement, the luminous flux on a line LE7 of the focus detection region FR7 is bent by the condenser lens 222a to reach the curves (also referred to as the distortion curves) LF7 and LG7 on the sensor arrangement surface of the sensor chip 227. Further, the paired distance measurement sensors C312 and C322 are arranged respectively along the distortion curves LF7 and LG7 on the sensor arrangement surface of the sensor chip 227. As a result, both of the paired distance measurement sensors C312 and C322 can properly receive the associated images. This completely eliminates or suppresses the impact of the above-described distortion, thus suppressing the decline in AF accuracy.

In the second embodiment in particular, the distance measurement sensor C312 is arranged on and along the curve LF7. As a result, the light from the points on the line LE7 of the focus detection region FR7 is more properly received by the same sensor C312. In other words, the distance measurement sensor C312 can accurately obtain the change in light image in the same direction as the line LE7. The same is true for the distance measurement sensor C322. The same sensor C322 can accurately obtain the change in light image in the same direction as the line LE7. Therefore, the paired distance measurement sensors C312 and C322 allow for accurate AF operation by using the light image in the same direction as the line LE7.

The same is true for the luminous fluxes for the other pair of distance measurement sensors C311 and C321.

The distance measurement sensor C311 is arranged on and along the curve LF6. It should be noted that we assume that the curve LF6 is bent to a greater extent in the second embodiment than in the first embodiment.

More specifically, the distance measurement sensor C311 is shifted downward from the distance measurement sensor C313 by the distance D11 in the vertical direction of FIG. 23. Further, the distance measurement sensor C321 is shifted downward from the distance measurement sensor C323 by a distance (D11+d21) in the vertical direction of FIG. 23. In other words, the distance measurement sensor C321 is arranged more downward than the distance measurement sensor C311 by the distance d21 in the vertical direction.

Further, the distance measurement sensor C311 is rotated by an angle θ11 relative to the distance measurement sensor C313 and line LC, and the distance measurement sensor C321 by an angle θ21 relative to the distance measurement sensor C313 and line LC. Here, the angle θ21 is greater than the angle θ11.

As described above, the paired distance measurement sensors C311 and C321 are horizontally spaced from each other and arranged at different angles on the sensor arrangement surface of the sensor chip 227. Further, the same sensors C311 and C321 are arranged at different vertical positions on the sensor arrangement surface.

In such an arrangement, the luminous flux on the line LE6 of the focus detection region FR6 is bent by the condenser lens 222a to reach the curves (also referred to as the distortion curves) LF6 and LG6 on the sensor arrangement surface of the sensor chip 227. Further, the paired distance measurement sensors C311 and C321 are arranged respectively along the distortion curves LF6 and LG6 on the sensor arrangement surface of the sensor chip 227. As a result, both of the paired distance measurement sensors C311 and C321 can properly receive the associated images. This completely eliminates or suppresses the impact of the above-described distortion, thus suppressing the decline in AF accuracy.

In the second embodiment in particular, the distance measurement sensor C311 is arranged on and along the curve LF6. As a result, the light from the points on the line LE6 of the focus detection region FR6 is more properly received by the same sensor C311. In other words, the distance measurement sensor C311 can accurately obtain the change in light image in the same direction as the line LE6 of the focus detection region FR6. The same is true for the distance measurement sensor C321. Therefore, the paired distance measurement sensors C311 and C321 allow for accurate AF operation by using the light image in the same direction as the line LE6.

In the arrangement of FIG. 23, on the other hand, the angle θ21 at which the distance measurement sensor C321 is arranged is greater than the angle θ22 at which the distance measurement sensor C322 is arranged. As described above, the farther the sensors of the distance measurement sensor group C32 are from the line LC, the greater the angle at which the sensors are arranged relative to the line LC should be. This provides more proper reduction of the impact of distortion. Similarly, the angle θ11 at which the distance measurement sensor C311 is arranged is greater than the angle θ12 at which the distance measurement sensor C312 is arranged. As described above, the farther the sensors of the distance measurement sensor group C31 are from the line LC, the greater the angle at which the sensors are arranged relative to the line LC should be. This provides more proper reduction of the impact of distortion.

On the other hand, the relative angle (θ21-θ11) between the paired distance measurement sensors C311 and C321 is greater than the relative angle (θ22-θ12) between the paired distance measurement sensors C312 and C322. As described above, the farther the sensors of the distance measurement sensor group C31 are from the line LC, the greater the relative angle between the sensors should be. This ensures more proper reduction of the impact of distortion.

The same is true for the plurality of other distance measurement sensor pairs (C314 and C324) and (C315 and C325). The arrangement of the paired distance measurement sensors C314 and C324 and that of the paired distance measurement sensors C312 and C322 are line symmetrical with respect to the line LC. Further, the arrangement of the paired distance measurement sensors C315 and C325 and that of the paired distance measurement sensors C311 and C321 are line symmetrical with respect to the line LC. The distance measurement sensor pairs (C314 and C324) and (C315 and C325) provide the same advantageous effects as the distance measurement sensor pairs (C312 and C322) and (C311 and C321).

3. Third Embodiment

In the first embodiment, a case was shown in which the paired distance measurement sensors C311 and C321 were arranged at different angles and at different vertical positions. However, the present invention is not limited thereto. For example, the paired distance measurement sensors C311 and C321 may be arranged at the same angle but at different vertical positions. In the third embodiment, such a modification example will be described.

Figure 24:
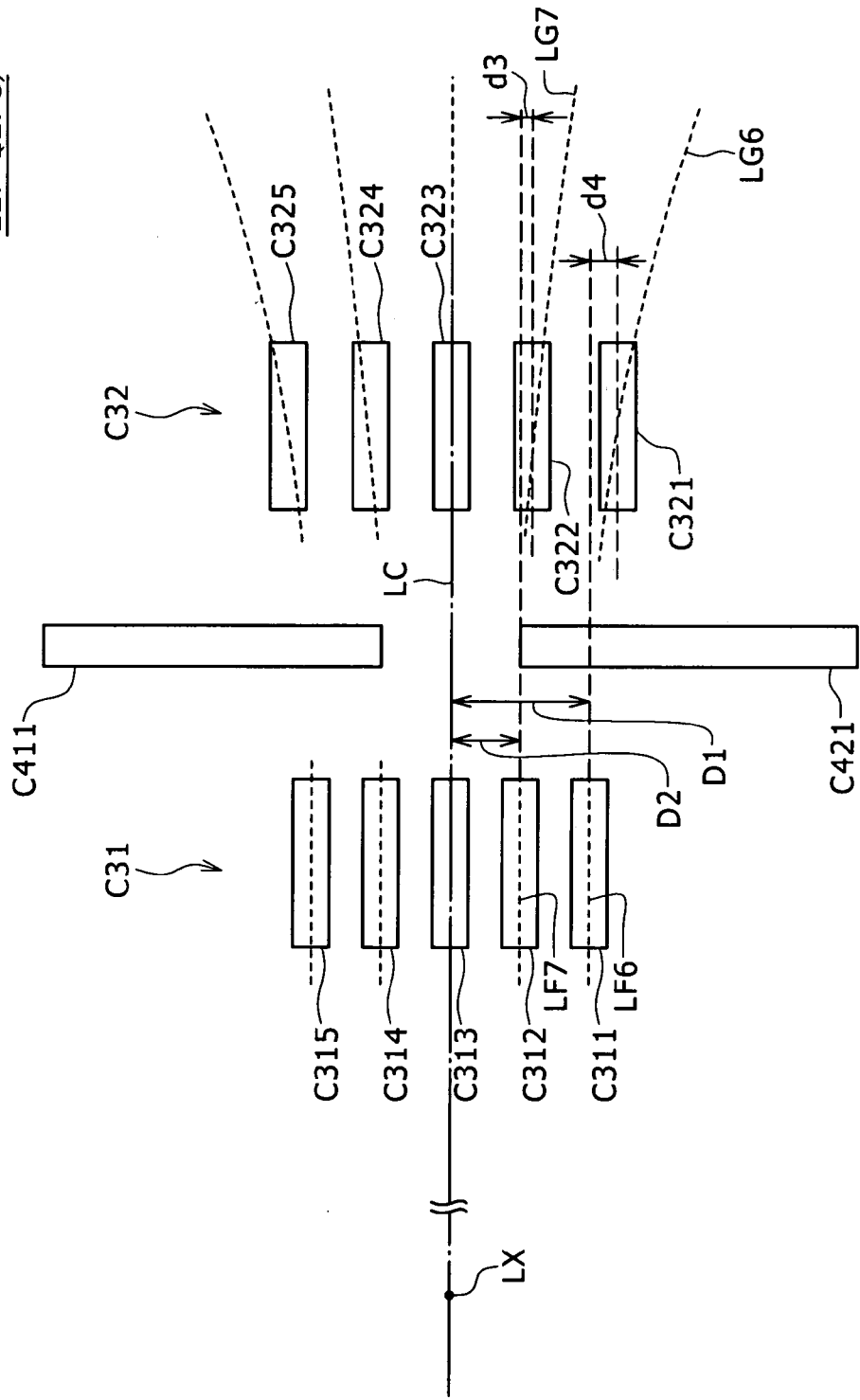
FIG. 24 is a diagram illustrating part of the sensor chip according to a third embodiment.

FIG. 24 is a diagram illustrating part of the sensor chip 227 (227C) according to the third embodiment.

As illustrated in FIG. 24, in the third embodiment, the distance measurement sensor group C31 is arranged in the same manner as in the first embodiment. On the other hand, the distance measurement sensor group C32 is arranged differently from that in the first embodiment.

More specifically, as is clear by comparison with FIG. 22, not only the sensors C311 to C315 of the distance measurement sensor group C31 but also the sensors C321 to C325 of the distance measurement sensor group C32 are arranged parallel to the line LC. In other words, the distance measurement sensors are arranged at the same angle.

It should be noted, however, that the distance measurement sensors are arranged at different vertical positions.

For example, the distance measurement sensor C311 is shifted downward from the distance measurement sensor C313 by the distance D1 in the vertical direction of FIG. 24. Further, the distance measurement sensor C321 is shifted downward from the distance measurement sensor C323 by a distance (D1+d4) in the vertical direction of FIG. 24. In other words, the distance measurement sensor C321 is arranged more downward than the distance measurement sensor C311 by the distance d4 in the vertical direction of FIG. 24.

In such an arrangement, the paired distance measurement sensors C311 and C321 are arranged not along but respectively on the distortion curves LF6 and LG6 on the sensor arrangement surface of the sensor chip 227. As a result, both of the paired distance measurement sensors C311 and C321 can properly receive the associated images. This completely eliminates or suppresses the impact of the above-described distortion, thus suppressing the decline in AF accuracy.

The same is true for the plurality of other distance measurement sensor pairs (C312 and C322), (C314 and C324) and (C315 and C325).

4. Fourth Embodiment

In the first embodiment, a case was shown in which the paired distance measurement sensors C311 and C321 were arranged at different angles and at different vertical positions. However, the present invention is not limited thereto. For example, the paired distance measurement sensors C311 and C321 may be arranged at the same vertical position but at different angles on the sensor arrangement surface. In the fourth embodiment, such a modification example will be described.

Figure 25:
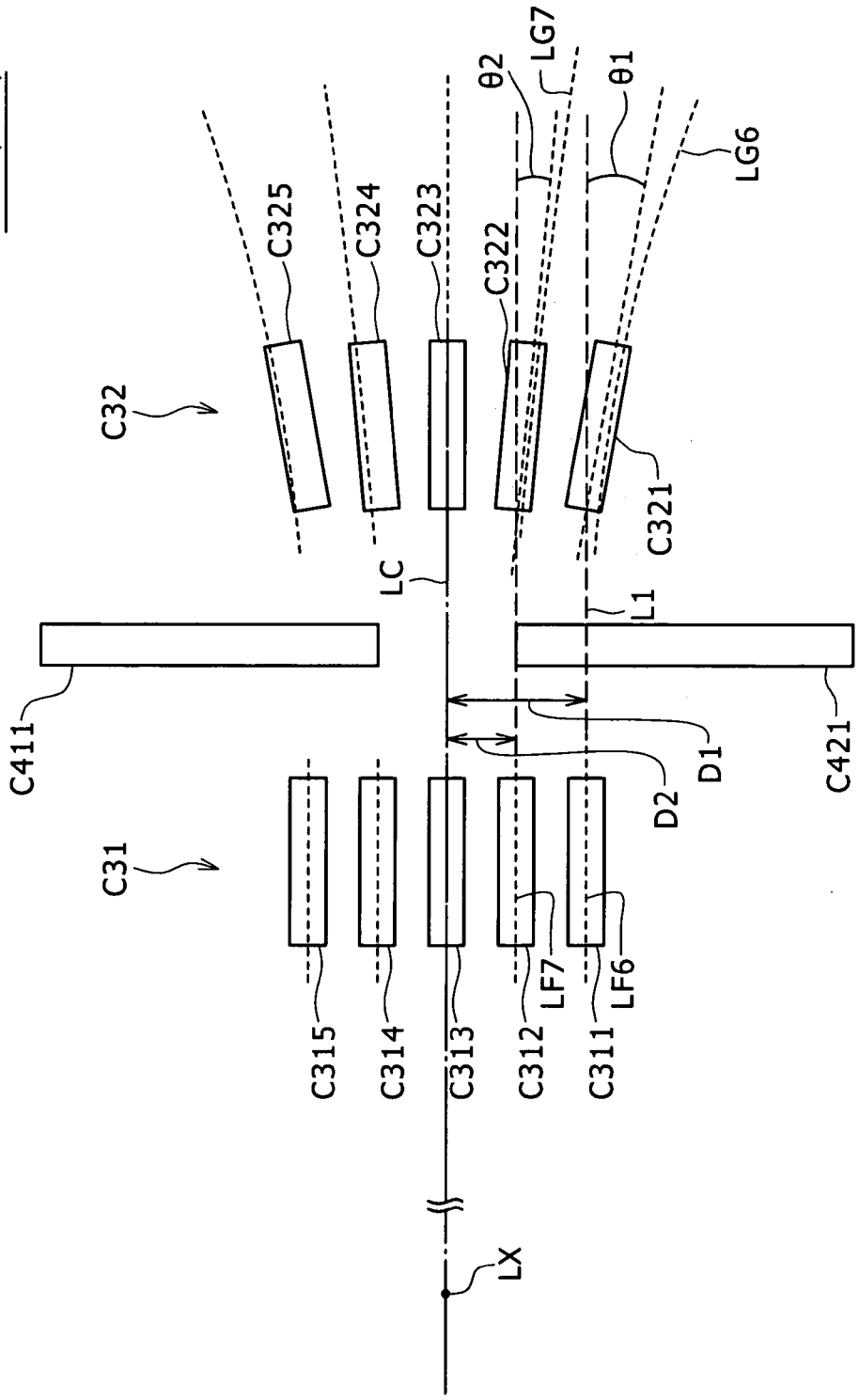
FIG. 25 is a diagram illustrating part of the sensor chip according to a fourth embodiment.

FIG. 25 is a diagram illustrating part of the sensor chip 227 (227D) according to the fourth embodiment.

As illustrated in FIG. 25, in the fourth embodiment, the distance measurement sensor group C31 is arranged in the same manner as in the first embodiment. On the other hand, the distance measurement sensor group C32 is arranged differently from that in the first embodiment.

More specifically, the distance measurement sensor C321 is horizontally (direction parallel to the line LC) spaced from and arranged at the same angle as the distance measurement sensor C311 and rotated clockwise about its left edge by the predetermined angle θ1. As with the distance measurement sensor C311, the distance measurement sensor C321 has its left edge arranged downward at the distance D1 from the distance measurement sensor C313 (and the sensor C323) in the vertical direction of FIG. 25. As described above, the distance measurement sensors C311 and C321 have one of their edges (left edge) located at the same position and arranged at different angles.

In such an arrangement, the paired distance measurement sensors C311 and C321 are arranged respectively along the distortion curves LF6 and LG6 on the sensor arrangement surface of the sensor chip 227. As a result, both of the paired distance measurement sensors C311 and C321 can properly receive the associated images. This completely eliminates or suppresses the impact of the above-described distortion, thus suppressing the decline in AF accuracy. It should be noted that such an arrangement is particularly effective when the distortion curve LG6 is displaced from a line L1 only to a comparatively small extent near the distance measurement sensor C321. Here, the line L1 is a line shifted downward in FIG. 25 from the line LC by the distance D1.

The same is true for the other distance measurement sensor pairs (C312 and C322), (C314 and C324) and (C315 and C325).

In the present embodiment, a case has been shown in which the left edges of the paired distance measurement sensors C311 and C321 are located at the same vertical position on the sensor arrangement surface. However, the present invention is not limited thereto. For example, the paired distance measurement sensors C311 and C321 may be arranged at the same average vertical position but at different angles.

5. Modification Examples

Although embodiments of the present invention have been described, the present invention is not limited to these embodiments, but may be modified in various ways.

In the first embodiment, for example, a case was shown as an example in which the angle at which the distance measurement sensor C321 was arranged was changed by arranging the photoreceiving element array of the same sensor C321 as illustrated in FIG. 19. However, the present invention is not limited thereto.

Figure 26:
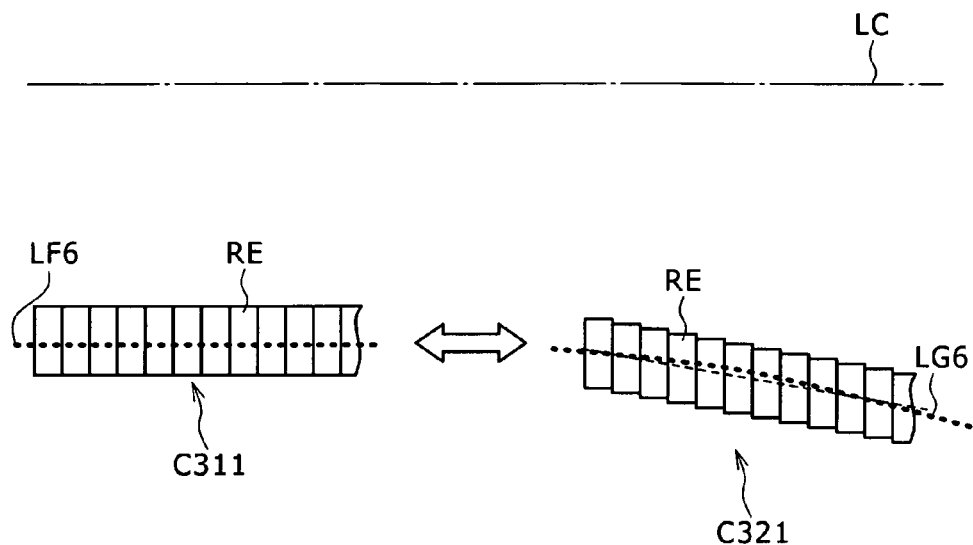
FIG. 26 is a diagram illustrating the arrangement of the photoreceiving element array in the distance measurement sensor according to a modification example.

More specifically, the photoreceiving element array of the same sensor C321 may be arranged as illustrated in FIG. 26. Comparing FIG. 26 with FIG. 19, the two arrangements are common in that each of the photoreceiving elements of the distance measurement sensor C321 is arranged along the line LG6 (or curve LG6) which is inclined by the predetermined angle θ1 relative to the line LC. It should be noted, however, that, in FIG. 26, each of the plurality of photoreceiving elements of the distance measurement sensor C321 is arranged at the same inclination angle (zero relative to the vertical direction) as each of the plurality of photoreceiving elements of the distance measurement sensor C311. The plurality of photoreceiving elements of the distance measurement sensor C321 are vertically displaced little by little in such a manner as to be arranged along the curve LG6. The angle at which the distance measurement sensor C321 is arranged can also be changed by arranging the photoreceiving elements RE of the distance measurement sensor C321 as described above. The same is true for the other distance measurement sensors (e.g., C322).

Figure 27:
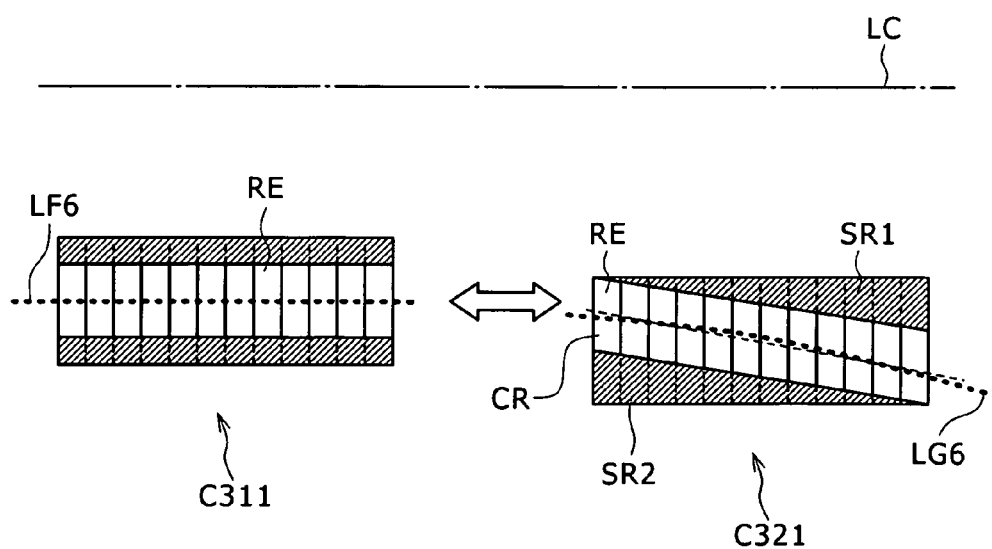
FIG. 27 is a diagram illustrating the photoreceiving element array in the distance measurement sensor according to another modification example.

Alternatively, shading sections SR1 and SR2 as illustrated in FIG. 27 may be provided in the photoreceiving element array of the distance measurement sensor C321. In FIG. 27, each of the plurality of photoreceiving elements of the distance measurement sensor C321 is arranged at the same inclination angle (zero relative to the vertical direction) as each of the plurality of photoreceiving elements of the distance measurement sensor C311. More specifically, the photoreceiving element array is arranged horizontally, and the photoreceiving elements are arranged at the same vertical position. It should be noted, however, that the shading sections SR (SR1 and SR2) are provided, one on the top and the other on the bottom of the photoreceiving elements RE, to cover part of the photoreceiving region of the same elements RE. The shading sections SR are formed, for example, as aluminum layers in the semiconductor manufacturing step. An intermediate section CR of each of the photoreceiving elements RE between the upper and lower shading sections SR1 and SR2 functions as a photoreceiving section of the distance measurement sensor C321. The intermediate section CR is a photoreceiving area in the photoreceiving elements RE of the distance measurement sensor C321, being not covered with the shading sections SR1 and SR2.

In FIG. 27, the shading sections SR are arranged so that the intermediate section CR is diagonal relative to the horizontal direction. More specifically, in the photoreceiving element array arranged horizontally (from left to right), the upper and lower shading sections SR1 and SR2 are vertically gradually displaced in the same direction (e.g., downward). This allows for the intermediate section CR to be arranged along the line LG6 (or curve LG6) which is inclined by the predetermined angle θ1 relative to the line LC. As described above, the angle at which the distance measurement sensor C321 is arranged can also be changed by providing shading sections in the photoreceiving element array of the same sensor C321. The same principle applies to the other distance measurement sensors such as the sensor C322.

Further, in the first embodiment (FIGS. 18 and 22), we assumed that the distance measurement sensor C311 is arranged roughly along the distortion curve LF6. However, the present invention is not limited thereto. For example, the same advantageous effects as described above can be achieved even if the angle θ1 at which the distance measurement sensor C321 is arranged is substantially equal to a value θd given below. Here, the value θd denotes the difference between the slope of the approximate line of the curve LF6 near the distance measurement sensor C311 and the slope of the approximate line of the curve LG6 near the distance measurement sensor C321. In other words, the value θd is the relative angle between the approximate lines of the curves LF6 and LG6.

In the modification example as described above, we assume that the slope of the approximate line of the curve LF6 near the distance measurement sensor C311 is relatively large. In such a condition, the light on the line LE6 does not reach the distance measurement sensor C311 properly. Instead, the light on a line LH6 (not shown), which is slightly inclined relative to the line LE6, reaches the distance measurement sensor C311 properly. It should be noted, however, that, even in such a condition, when the arrangement angle θ1 is equal to the value θd, both the distance measurement sensors C311 and C321 can properly obtain the change in light image of the same portion of the subject in the same direction. That is, the distance measurement sensors C311 and C321 receive the light image on the line LH6. This provides accurate AF operation although there is a slight displacement in the AF direction.

Figure 28:
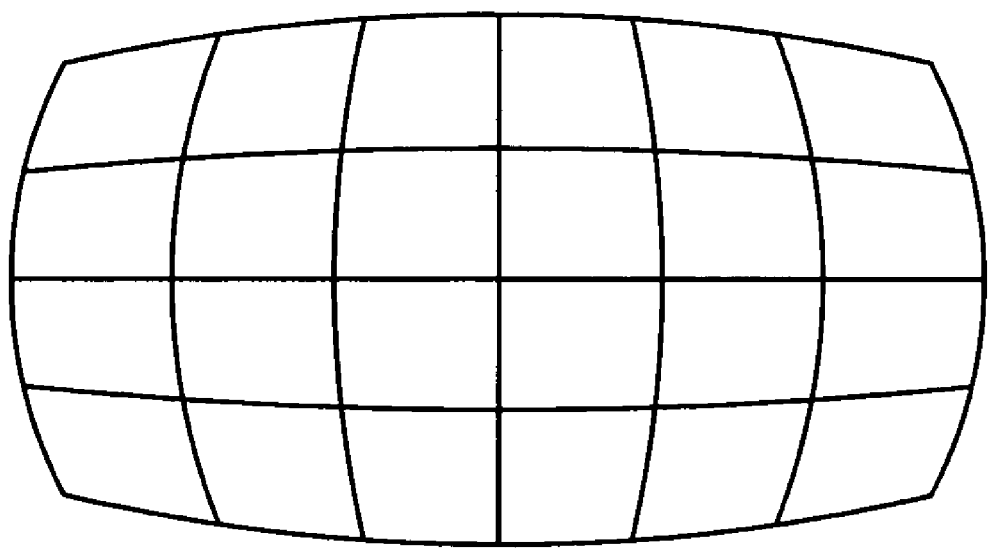
FIG. 28 is a conceptual diagram illustrating a barrel distortion.

Further, cases were shown in the above embodiments in which pincushion distortion occurred due to the condenser lens 222. However, the present invention is not limited thereto. For example, the above concept may be applied in the presence of barrel distortion (refer to FIG. 28). It should be noted that, in the presence of barrel distortion, it is only necessary to reverse the angle at which the associated distance measurement sensor is arranged from that in the above embodiments. For example, it is only necessary to shift the distance measurement sensor C321 (refer to FIG. 22), spaced horizontally from the distance measurement sensor C311 by the predetermined distance, "upward" (in the opposite direction to that in FIG. 22) by the predetermined distance (e.g., d1) and rotate it "counterclockwise" by the predetermined angle (e.g., ƒ1).

Still further, cases were shown in the above embodiments in which the above concept was applied to a divided beam which passes through the condenser lens 222a (or 222b) having its optical axis displaced horizontally from the optical axis LX of the light image from the shooting optical system.

However, the present invention is not limited thereto. For example, the above concept may be applied to a divided beam which passes through the condenser lens 222c having the optical axis LX as its central axis.

Still further, cases were shown in the above embodiments in which the AF control section 113 was provided outside the AF module 20. However, the present invention is not limited thereto. For example, the AF module 20 (focal point detector) may incorporate a control section similar to the AF control section 113.

It should be understood by those skilled in the art that various modifications, combinations, sub-combinations and alterations may occur depending on design requirements and other factors insofar as they are within the scope of the appended claims or the equivalents thereof.

What is claimed is:

1. A focal point detector comprising:
a condenser lens adapted to transmit a light image from an optical system; and
a distance measurement sensor group adapted to receive a luminous flux which has passed through the condenser lens, wherein
the distance measurement sensor group includes a first distance measurement sensor pair adapted to receive divided beams of the luminous flux for a first focus detection region which is located off the center of a shooting region,
the first distance measurement sensor pair includes first and second distance measurement sensors,
the first focus detection region extends in a first direction in the shooting region from a position where the first focus detection region is spaced from the center in the first direction and also in a second direction perpendicular to the first direction, and
the first and second distance measurement sensors are spaced from each other and arranged at different angles in the direction associated with the first direction on a sensor arrangement surface.

2. The focal point detector of claim 1, wherein
the condenser lens has an optical axis displaced in a predetermined direction from the optical axis of the light image from the optical system.

3. The focal point detector of claim 1, wherein
the first and second distance measurement sensors are arranged at different positions in the direction associated with the second direction on the sensor arrangement surface.

4. The focal point detector of claim 1, wherein
a luminous flux on a predetermined line of the first focus detection region is bent by the condenser lens to reach distortion curves on the sensor arrangement surface, and
the first and second distance measurement sensors are arranged respectively on the distortion curves on the sensor arrangement surface.

5. The focal point detector of claim 1, wherein
the first and second distance measurement sensors are arranged respectively along the distortion curves on the sensor arrangement surface.

6. The focal point detector of claim 1, wherein
the distance measurement sensor group further includes a second distance measurement sensor pair adapted to receive divided beams of the luminous flux for a second focus detection region which is located off the center of a shooting region,
the second focus detection region extends in the first direction in the shooting region from a position where the second focus detection region is spaced from the center in the first and second directions,
the second focus detection region is displaced more from a reference line than the first focus detection region,
the reference line passes through the center of the shooting region and extends in the first direction in the shooting region, and
sensors of the second distance measurement sensor pair are spaced from each other in the direction associated with the first direction and arranged at a relative angle greater than that between the sensors of the first distance measurement sensor pair on the sensor arrangement surface.

7. The focal point detector of claim 1, wherein
the first distance measurement sensor includes a first photoreceiving element array,
the second distance measurement sensor includes a second photoreceiving element array, and
the first and second photoreceiving element arrays are arranged in different directions.

8. A focal point detector comprising:
a condenser lens adapted to transmit a light image from an optical system; and
a distance measurement sensor group adapted to receive a luminous flux which has passed through the condenser lens, wherein
the distance measurement sensor group includes a first distance measurement sensor pair adapted to receive divided beams of the luminous flux for a first focus detection region which is located off the center of a shooting region,
the first distance measurement sensor pair includes first and second distance measurement sensors,
the first focus detection region extends in a first direction in the shooting region from a position where the first focus detection region is spaced from the center in the first direction and also in a second direction perpendicular to the first direction, and
the first and second distance measurement sensors are spaced from each other and arranged at different angles in the direction associated with the first direction on a sensor arrangement surface, and
wherein
the first distance measurement sensor includes a first photoreceiving element array,
the second distance measurement sensor includes a second photoreceiving element array,
part of the photoreceiving region of the second photoreceiving element array is covered with a shading section, and
the photoreceiving region of the second photoreceiving element array not covered with the shading section is arranged in a direction different from that of the first photoreceiving element array.

9. An imaging device comprising:
a phase difference focal point detector; and
autofocus control means for performing autofocus operation based on distance measurement results obtained by the focal point detector,
the focal point detector including
a condenser lens adapted to transmit a light image from an optical system, and
a distance measurement sensor group adapted to receive a luminous flux which has passed through the condenser lens, wherein
the distance measurement sensor group includes a first distance measurement sensor pair adapted to receive divided beams of the luminous flux for a first focus detection region which is located off the center of a shooting region, the first focus detection region extends in a first direction in the shooting region from a position where the first focus detection region is spaced from the center in the first direction and also in a second direction perpendicular to the first direction, and sensors of the first distance measurement sensor pair are spaced from each other and arranged at different angles in the direction associated with the first direction on a sensor arrangement surface.

\* \* \* \* \*